United States Patent
DeFlumere

(10) Patent No.: US 6,741,341 B2
(45) Date of Patent: May 25, 2004

(54) REENTRY VEHICLE INTERCEPTOR WITH IR AND VARIABLE FOV LASER RADAR

(75) Inventor: Michael E. DeFlumere, Winchester, MA (US)

(73) Assignee: BAE Systems Information and Electronic Systems Integration Inc, Nashua, NH (US)

( * ) Notice: Subject to any disclaimer, the term of this patent is extended or adjusted under 35 U.S.C. 154(b) by 0 days.

(21) Appl. No.: 10/357,158

(22) Filed: Feb. 3, 2003

(65) Prior Publication Data

US 2004/0021852 A1 Feb. 5, 2004

Related U.S. Application Data

(60) Provisional application No. 60/354,102, filed on Feb. 4, 2002.

(51) Int. Cl.$^7$ ............................ G01B 11/26; G01C 3/08; G01C 21/02; G01J 5/02
(52) U.S. Cl. .............. 356/141.1; 356/4.01; 356/139.04; 356/139.07; 250/203.6; 250/342
(58) Field of Search ............................ 356/4.01, 141.1, 356/139.04, 139.07, 5.01; 250/203.6, 342

(56) References Cited

U.S. PATENT DOCUMENTS

| | | | |
|---|---|---|---|
| 3,644,043 A | * | 2/1972 | Jones et al. |
| 3,781,111 A | * | 12/1973 | Fletcher et al. |
| 3,971,939 A | | 7/1976 | Andressen |
| 4,229,103 A | * | 10/1980 | Hipp |
| 5,114,226 A | * | 5/1992 | Goodwin et al. |
| 5,210,586 A | * | 5/1993 | Grage et al. |
| 5,389,791 A | | 2/1995 | Passmore |
| 5,524,845 A | | 6/1996 | Sims et al. |
| 5,608,514 A | | 3/1997 | Stann et al. |
| 5,644,386 A | | 7/1997 | Jenkins et al. |
| 5,682,229 A | * | 10/1997 | Wangler ............... 356/4.01 |
| 5,779,187 A | | 7/1998 | Dulat et al. |
| 5,867,118 A | | 2/1999 | McCoy et al. |
| 5,937,078 A | | 8/1999 | Hyland et al. |
| 5,947,413 A | | 9/1999 | Mahalanobis |
| 6,042,050 A | | 3/2000 | Sims et al. |
| 6,163,372 A | | 12/2000 | Sallee et al. |
| 6,262,800 B1 | | 7/2001 | Minor |
| 6,302,355 B1 | | 10/2001 | Sallee et al. |
| 6,323,941 B1 | | 11/2001 | Evans et al. |

OTHER PUBLICATIONS

Barnell, Mark D. et al., Fusion Processor Simulation (FPSIM), Proceedings of 1998 Winter Simulation Conference, pp. 859–864.

Snorranson, Magnus et al., Automatic Target Recognition in Laser Radar Imagery, Charles River Analytics, 55 Wheeler Street, Cambridge, MA 02138, 4 pages.

Fluck, R. et al., Passively Q-switched 1.34-$\mu$m Nd:YVO$_4$ microchip laser with semiconductor saturable–absorber mirrors, Optics Letters, Jul. 1, 1997, pp. 991–993 vol. 22, No. 13, Optical Society of America.

Kong, Hong Jin, et al. Forced turn–off of a passively Q-switched Nd:YAG pulse by restoration of saturable loss by the use of an auxillary cavity, Optics Letters, Apr. 15, 1995, pp. 884–886, vol. 20, No. 8, Optical Society of America.

* cited by examiner

Primary Examiner—Stephen C. Buczinski
(74) Attorney, Agent, or Firm—Maine & Asmus

(57) ABSTRACT

A dual mode seeker for intercepting a reentry vehicle or other target is disclosed. In one embodiment, the seeker is configured with an onboard 3D ladar system coordinated with an onboard IR detection system, where both systems utilize a common aperture. The IR and ladar systems cooperate with a ground based reentry vehicle detection/tracking system for defining a primary target area coordinate and focusing the IR FOV thereon. The IR system obtains IR image data in the IR FOV. The ladar system initially transmits with a smaller laser FOV to illuminate possible targets, rapidly interrogating the IR FOV. The ladar system obtains data on each possible target to perform primary discrimination assessments. Data fusion is employed to resolve the possible targets as between decoys/clutter and a reentry vehicle. The laser FOV is expandable to the IR FOV. Robust and reliable discrimination is obtained at high altitudes.

40 Claims, 16 Drawing Sheets

REENTRY VEHICLE INTERCEPTOR WITH IR AND VARIABLE FOV LASER RADAR

RELATED APPLICATIONS

This application claims the benefit of U.S. Provisional Application No. 60/354,102, filed Feb. 2, 2002 which is herein incorporated in its entirety by reference.

FIELD OF THE INVENTION

The invention relates to defense systems, and more particularly, to a dual mode seeker/interceptor having integrated IR and laser radar (ladar) capability with a variable FOV.

BACKGROUND OF THE INVENTION

The flight of a ballistic missile can be divided into three phases: a boost phase, a mid-course phase, and a terminal or theater phase. During the boost phase, which includes the first minutes of flight, reentry vehicles and decoys contained within the launched missile are not released. The mid-course phase is the portion of the flight where the missile is outside the atmosphere as it travels to the target. Reentry vehicles and decoys in the missile are released during this phase, and form what is referred to as a threat cloud. The terminal phase represents the last minutes of flight where the reentry vehicles and decoys reenter the atmosphere on their way to the target.

In typical missile defense systems, the launch of a ballistic missile from anywhere in the world is detected by space-borne assets (e.g., satellites and early warning radars), which will immediately begin transmitting preliminary trajectory information to a mission command center. During the mid-course phase, ground-based radars lock onto the elements in the threat cloud, and provide targeting information for ground-based interceptors with seekers. Near the end of the mid-course phase, these interceptors are launched. Ideally, the seekers discriminate between warheads and decoys in the threat cloud, and destroy the warheads.

Such target discrimination is not trivial, and presents significant technical challenges for hit-to-kill missile defense systems. Each object in a threat cloud must be effectively discriminated from the actual warhead-bearing reentry vehicles. Further complicating this task are the high altitudes (e.g., 50 kilometers or more) at which the discrimination takes place. The bulk of this discrimination task is carried out by the ground-based radars using a number of discrimination techniques, one of which is called stripping, thereby enabling the seekers.

In more detail, stripping relies on atmospheric drag to separate objects based on their ballistic coefficient $\beta = M/C_d A$, where M is the object mass, $C_d$ is the coefficient of drag, and A is the object area. Stripping is dependent on trajectory and object dynamics (spin and precession). Due to the coarseness of ground-based radar measurements, a significant atmospheric drag is required (altitudes of 50 to 70 km) to produce a measurable amount of relative velocity or separation. At extremely high altitudes (e.g., 100 kilometers or more), such atmospheric drag is substantially reduced or otherwise lacking, thereby impeding early discrimination. The density of objects and the deployment of chaff complicates and delays extraction of target dynamics and subsequent discrimination. In addition, the poor signal quality (e.g., low SNR) can contribute to late discrimination. Early discrimination is desirable for enabling a shoot-look-shoot engagement, appropriate interceptor commitment to threat load, and increased range of destroyed warhead from the targeted or otherwise defended assets.

Using all discrimination means available, the ground-based radar hands over assumed target position information to the seeker/kill vehicle. Typical seekers use a single color, passive IR sensor. Such seekers have less than optimal performance in situations where a potential target is in close proximity to other objects, (e.g., decoys and booster debris), which is typical of a threat cloud. Furthermore, additional error occurs because of the viewing ambiguity associated with a two dimensional (2D) IR seeker. Moreover, the residual effects of prior interceptions, such as the bright light called "flash," limit the effectiveness of the system. In particular, flash temporarily forms an alternate light source, thereby blinding the IR sensor. A laddering effect results, where a next incoming reentry vehicle after an intercept can approach even closer to the defended target due to the flash recovery time required by the interceptor's IR sensors.

In short, systems employing ground-based radar in conjunction with 2D IR seeker configurations have difficulty discriminating between legitimate targets and clutter, particularly at exo-atmospheric altitudes. Incorrect target discrimination, during high altitude stressing conditions, will substantially reduce the effectiveness of hit-to-kill defensive weapon systems.

What is needed, therefore, is an improved reentry vehicle intercept system that can quickly acquire, discriminate decoys and clutter from target reentry vehicles at very high altitudes, and track the selected vehicle to an intercept.

BRIEF SUMMARY OF THE INVENTION

A reentry vehicle intercept system is disclosed. In one embodiment, the system includes a seeker vehicle configured with an onboard three dimensional (3D) ladar system coordinated with an onboard IR detection system, where both systems utilize a common aperture. The IR and ladar systems cooperate with a ground based reentry vehicle detection/tracking system for defining a primary target area coordinate. The FOV associated with the IR system is focused thereon.

The onboard IR system obtains IR image data in the IR FOV. A variable FOV associated with the ladar system is initially smaller than the IR FOV during engagement, and the ladar system is adapted to systematically interrogate the IR FOV, illuminating possible targets, to discriminate objects located therein. The laser FOV is expandable toward the IR FOV when closing velocity, track angle, or target size subtends the laser FOV. Thus, the laser FOV can expand to any portion of the IR FOV, including a laser FOV that substantially matches the IR FOV.

An onboard processor or processors are programmed or otherwise configured to operate on data obtained on each possible target to perform primary discrimination assessments and other relevant data processing. Such onboard processing enables resolving the possible targets as between decoys/clutter and a reentry vehicle.

For instance, a processing module can be configured to form 3D images of one or more objects included in the field of view based on the detected laser return information. In addition, a processing module can be configured to perform discrimination assessments based on discrimination parameters including at least one of relative velocity, track, and separation data. In addition, a processing module can be configured to perform data fusion between at least two of discrimination assessments, target object map (TOM) data, 3D laser image data, and 2D IR image data.

The ladar system can be configured to operate in various detection modes. For example, the ladar system can be configured to operate as at least one of an angle, angle, range direct detection type system (e.g., Geiger and linear detection modes), and a pulsed Doppler coherent detection type system (e.g., modulated continuous wave radars). In an embodiment where the laser detector includes an array, the ladar system may be configured to operate as a hybrid detection system, where a first portion of the laser detector array performs coherent detection, and second portion of the laser detector array performs linear mode direct detection.

The IR and ladar systems complement each other. The IR provides a broad focus for target acquisition. The narrow focus and pulse capability of the ladar system, with fast 3D processing times, allow higher resolution and the ability to interrogate each potential target within a FOV. The ladar also allows the missile to lock on to an individual target, even in the presence of flash. Robust and reliable threat/decoy discrimination is obtained at high altitudes (e.g., in excess of 100 km).

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
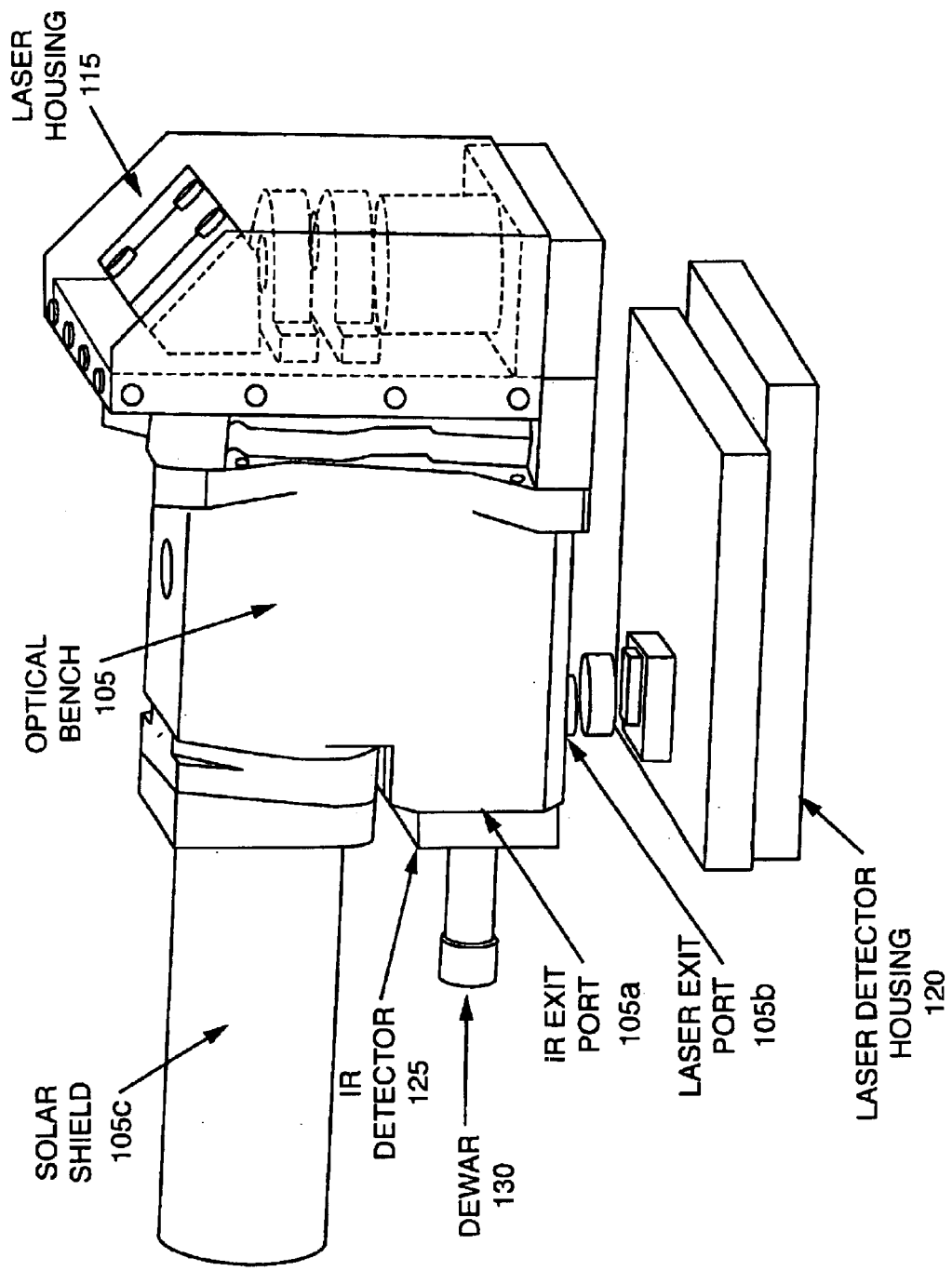
FIG. 1 is a model diagram illustrating a dual mode seeker configured in accordance with an embodiment of the present invention.

A reentry vehicle intercept system having a seeker configured with a ladar/IR combination system that can quickly acquire, discriminate a relatively large number of decoys and clutter from intended reentry vehicles at very high altitudes, and track the selected vehicle to an intercept is disclosed herein. A dual mode seeker capable of IR and ladar discrimination, coupled with ground based radar, greatly reduces the effectiveness of foreseeable countermeasures.

General Overview

Embodiments of the present invention provide for combining the operating features of wavelength, 3D resolution, and detection modes of a ladar and IR equipped seeker in a way to provide a unique discrimination and hit-to-kill solution. The ability to range gate with fast recovery electronics allows the ladar to separate the potential targets from foreground and background clutter.

The ladar is adapted to perform a series of precise measurements of first angle, second angle, and range, or pulsed Doppler measurements, and to develop 3D tracks on unresolved objects and 3D images on resolved objects thereby accomplishing robust and reliable discrimination. The resolved 3D images enable a successful intercept due to precise aimpoint selection and guidance in a clutter environment using predictive guidance algorithms. During the end game, the laser beam can be expanded to illuminate the entire target, and the laser detector has an FOV that matches that of the IR sensor.

While the intercept domains of terminal, midcourse and boost phase will use and benefit from ladar in varied ways, a benefit shared at each phase is that ladar provides significant performance improvement over the full engagement during stressing conditions, including those at exoatmospheric altitudes. For long range detection with reasonable laser power, the ladar will have a small beam width and corresponding FOV. Since radar and satellite target handoff baskets are large in angle space, an IR sensor is used to locate the objects of interest before the ladar is positioned on the object. The IR sensor also performs filtering to reduce the number of objects that the ladar must interrogate. The active concepts considered include both direct detect (Angle, Angle, Range) ladar and coherent detection (Angle, Angle, Range, Doppler).

A reentry vehicle intercept system configured in accordance with the principles of the present invention, having a dual mode seeker having an integrated ladar system with a variable FOV that can expand from hundreds of microradians to that of a coordinated IR system, enables the discrimination of targets early and at high altitudes thereby allowing for multiple intercept options.

Discrimination

Searching and discriminating a threat cloud starts with surface based radar. Here, potentially thousands of objects are reduced to tens or hundreds of areas of interest. The battle management system determines the launch location, time and intercept trajectory to optimize the probability of kill with knowledge of the interceptor's discrimination capabilities. This enables an early intercept to support a shoot-look-shoot scenario. Additional discrimination may be performed by the IR sensor, further reducing the areas of interest. The dual mode seeker's active ladar system is used to complement and further characterize targets for discrimination.

The ladar improves the spatial resolution by a factor of 5 to 10 over conventional missile defense systems, in that its wavelength is a factor of 5-10 shorter than that of a medium wave infrared (MWIR) seeker. The ladar is steered to objects of interest, and each object is sequentially interrogated. The substantially higher frame rate available to ladar as compared to MWIR focal plane arrays (FPA) enables rapid interrogation. To maintain the compactness of the seeker, the dual mode seeker is configured with a common aperture, as well as a folded optical pathway, that are shared by the active ladar and passive IR systems.

The ladar not only provides range information, but also provides a 3D image for each object interrogated. Depending on the hardware configuration employed by the ladar receiver, intensity information can also be obtained. This can be of use to measure object precession (coning), a useful discriminate parameter for distinguishing decoys. Also, the range information can be used to predict the intercept point. This method of intercept is more efficient than conventional proportional navigation and allows for flexibility of intercept geometry (i.e., a larger battle space). Another important feature of ladar is its ability to "see" through clutter of a previous intercept event by range gating and the use of fast recovery electronics. This is in contrast to the flash induced blindness associated with IR sensors.

Roles and Benefits of Ladar

In determining dual mode seeker requirements, it is helpful to consider potential roles and benefits of ladar, such as those listed in Table 1.

TABLE 1

Ladar Role and Requirement Drivers

| Ladar Role | Benefit Provided |
|---|---|
| CSO Discrimination | Resolution |
| 3D to 3D TOM | 3D Track Accuracy |
| Intense Source Rejection | Spatial, Spectral and Temporal Bandwidths |
| Aimpoint Determination | Transmitter Beam Width Control |
| Support Multi-Color | Not a Requirement Driver |
| Support Threat ID | Transmitter Beam Width Control |
| Predictive Intercept | 3D Track Accuracy |

Figure 5:
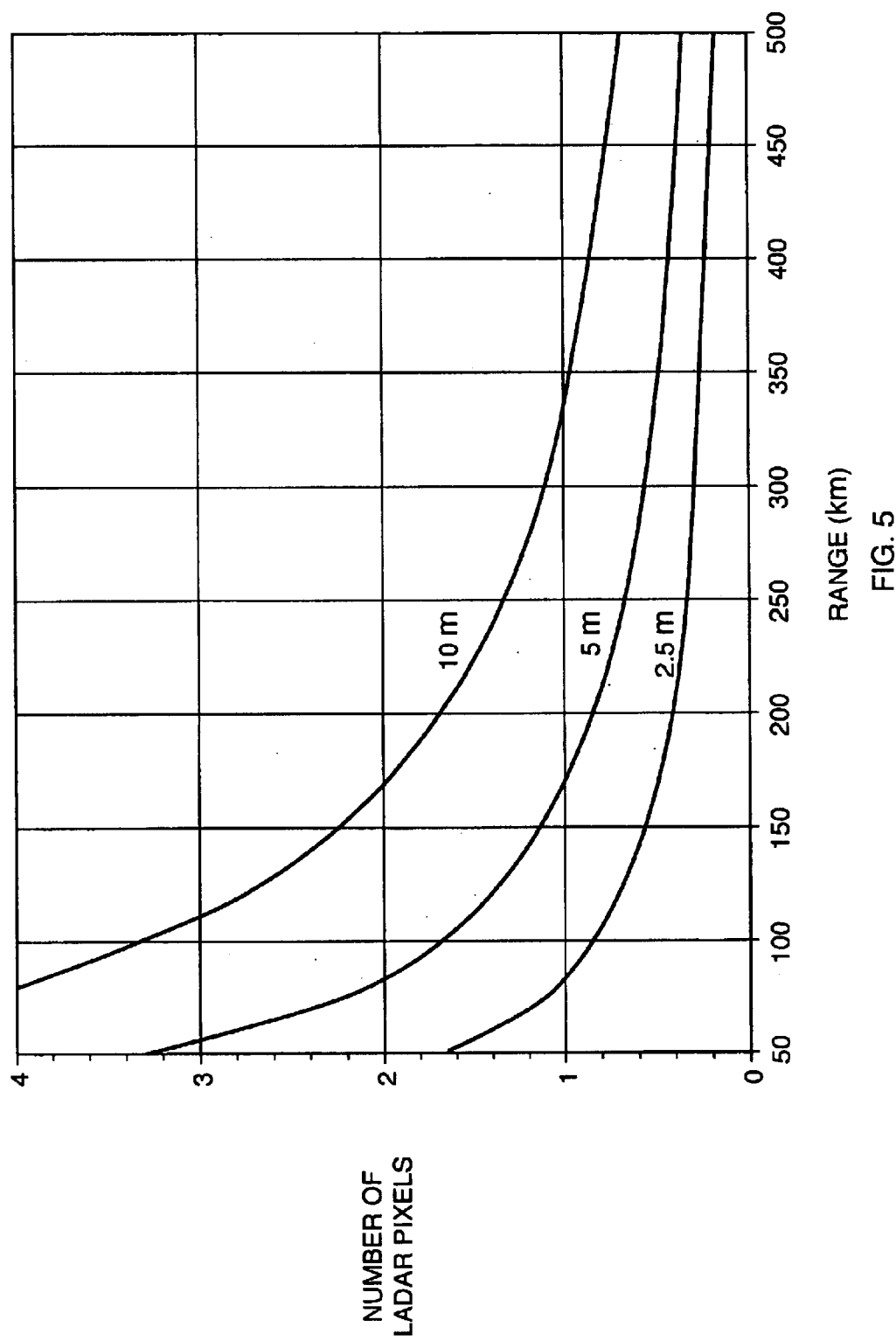
FIG. 5 illustrates the number of ladar pixels for separation of three closely spaced objects in accordance with an embodiment of the present invention.

The closely spaced objects (CSO) problem associated with a threat cloud requires a high resolution ladar receiver, for example, as demonstrated in FIG. 5. Here, a ladar with 30 microradian detector angular subtense (DAS) is viewing objects that are 2.5, 5 and 10 meters apart. Signal processing techniques, such as centroid, can be used to improve the object tracking to much less than one ladar pixel. This will enable CSO track separation starting at about 300 to 500 km, depending on object separation. A typical long wave infrared camera (LWIR) sensor with a large aperture (e.g., 20 cm) would have a diffraction limit (at 8 microns) of about 100 microradians. For conventional IR only seekers, the CSOs of a threat cloud would not be separated over a significant portion of the engagement.

Another important aspect of early separation of the object tracks by the ladar, is the tagging of IR pixels that contain more than one object. This tagging ability combined with range to the object will have a very positive effect on the performance of multi-color IR discrimination. Without this tagging and range information, an IR pixel with multiple objects will be seen as an average of temperature/area/emissivity of the represented objects.

Conventional seekers must correlate a 3D target object map (TOM) generated by surface based radar to a 2D scene from an IR sensor. Measurement error, seeker attitude and position errors, and latency all conspire to increase the risk of incorrect target handoff. In contrast, a dual mode seeker configured in accordance an embodiment of the present invention is able to offset this risk by providing a 3D to 3D correlation with the TOM generated by the surface based radar.

A cluttered battle space will also produce some intense sources (e.g., previous intercepts, IR countermeasures and other energetic events) that will impair or preclude object tracking with conventional techniques. The ladar is adapted for actively tracking in another band that is less influenced by these sources and can maintain track as well as aid the IR track to coast longer using 3D information. Given such background conditions, the ladar is configured with a narrow spectral bandpass to limit the received background energy. The ladar is also able to have a narrow range gate and perform frame to frame range processing. The small DAS, driven by other requirements also reduces the amount of unwanted signal. In short, simultaneous active ladar and passive IR tracking is difficult to defeat.

Figure 6:
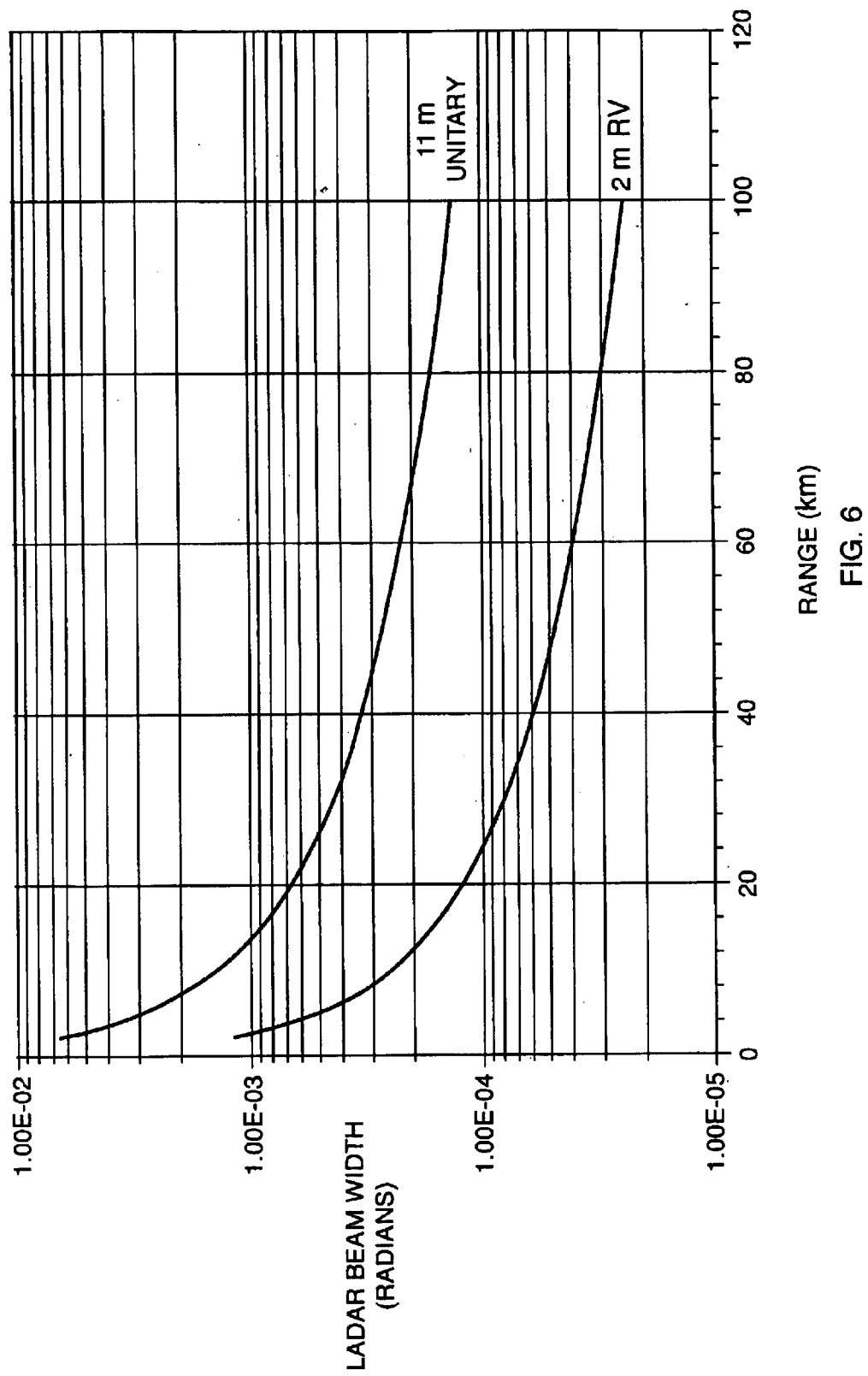
FIG. 6 illustrates the amount of beam expansion employed during the endgame in accordance with an embodiment of the present invention.

The endgame places a different set of requirements on the ladar. Here, a much wider laser beam is employed to keep the object fully illuminated as the range decreases. FIG. 6 demonstrates the amount of beam expansion required for a 2 meter long reentry vehicle (RV) and an 11 meter long unitary missile viewed at 90 degree aspect (broadside). The illustrated curves assume a 20% overfill to relax the system pointing and boresight requirements.

The ladar can aid in target identification by providing unique information throughout the engagement. Such information includes details on size and shape/features, estimate of mass, measurement of micro-dynamics, reflectivity at the laser wavelength and IR emissivity. The mass is estimated at those altitudes where there is sufficient interaction with the atmosphere. The emissivity is estimated by measurements in multiple IR bands knowing the size and range to the target. This information, fused with surface based radar information, will yield a high probability of target ID.

Figure 7:
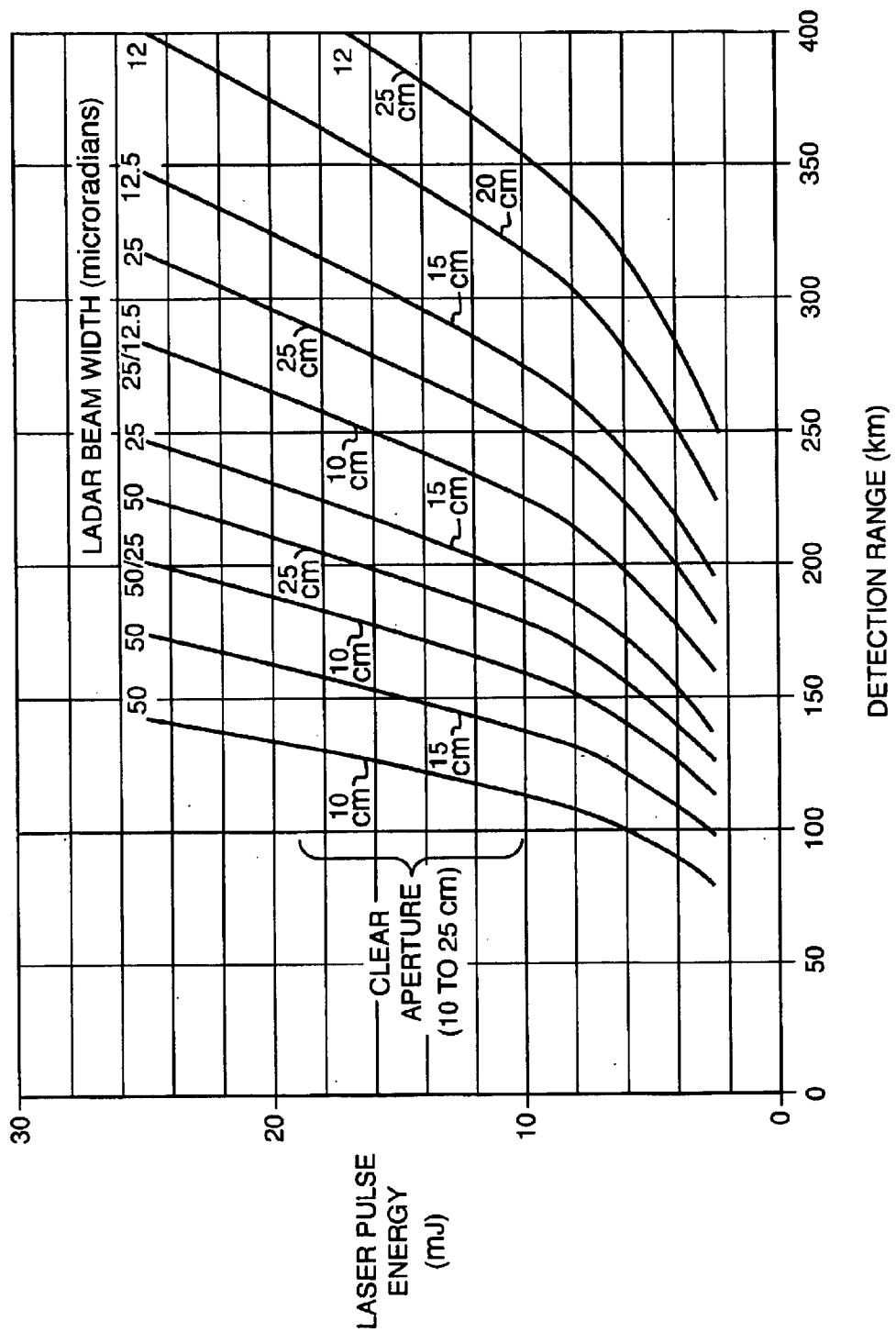
FIG. 7 illustrates the trade space for a direct detection ladar operating in Geiger mode in accordance with an embodiment of the present invention.

The required acquisition range drives the trade space of laser power, laser beam width, and collecting aperture. This trade space is illustrated in FIG. 7 for a direct detection ladar operating in the Geiger mode, where a single returned photon is detected. The illustrated curves represent four aperture sizes (10, 15, 20, and 25 cm) and three beam widths (50, 15, and 12.5 microradians). These curves are useful to explore system level trades, in that precise performance determination requires detail target signatures and engagement geometries. Assumptions made include: a common collecting aperture for both the IR and ladar receivers, a 1064 nanometer laser, a 0.5 meter target diameter, a 0.1 target reflectivity, one detected proton, a 0.5 receiver transmission, and a 0.8 transmitter transmission.

Note that other aperture sizes (e.g., 5 cm or 30 cm) and beam widths (e.g., 10 microradians or 75 microradians) are possible here as will be apparent in light of the disclosure, and the present invention is not intended to be limited by the examples demonstrated in FIG. 7.

Ladar Trades

Figure 8:
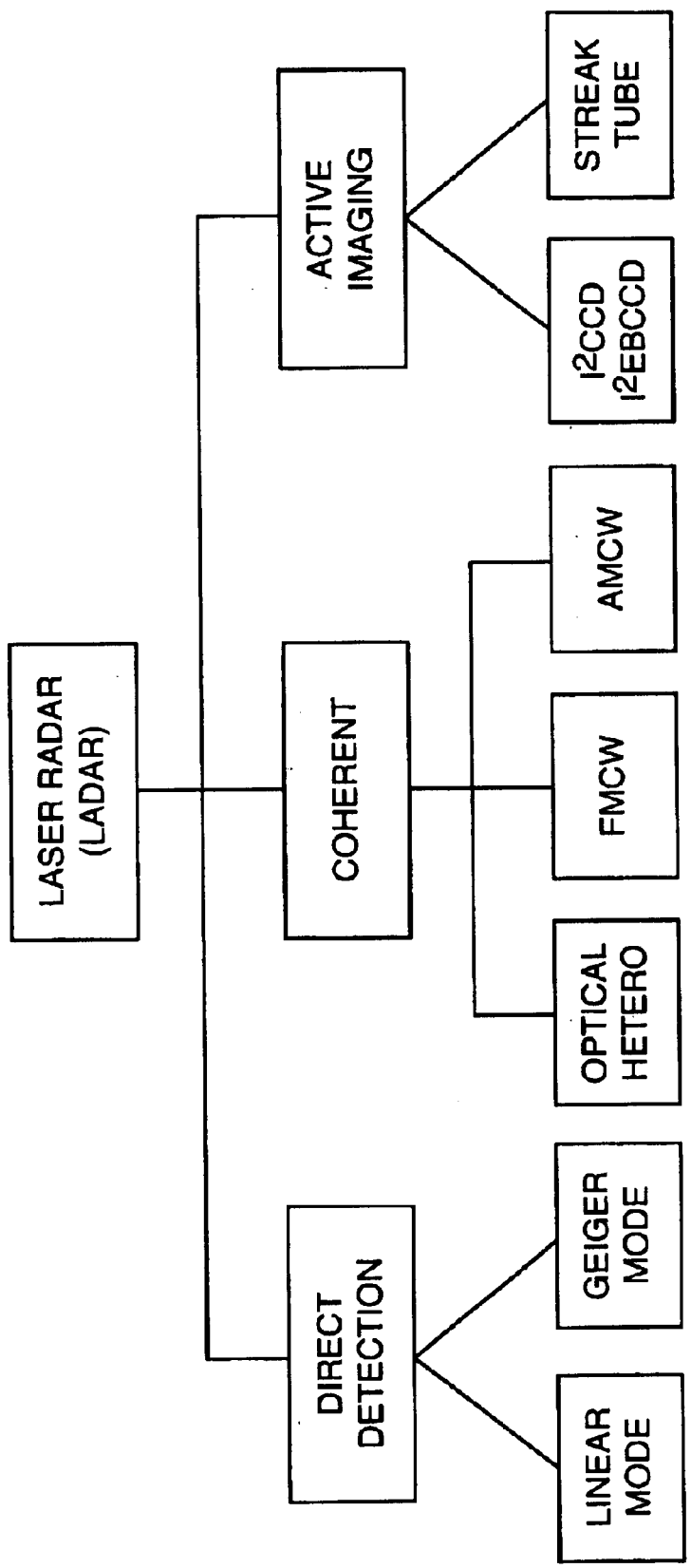
FIG. 8 illustrates a top level ladar trade tree.

A top level ladar trade tree is shown in FIG. 8. Given the desire for long range acquisition with practical hardware implementations, the ladar can employ the most sensitive techniques available, namely, coherent detection and Geiger mode. Under the right system conditions, both techniques can reach the shot noise limit, necessitating analysis of relevant trades.

The right conditions for Geiger mode are low background and manageable (via short range gate) dark current. Low background is achieved by optical filtering, range gating and engagement management (driven by the desire to have low IR backgrounds). The right conditions for coherent detection are low local oscillator noise and a stable optical system to maintain high heterodyne efficiency over the receiving array. Given that each technique can be made to have equivalent sensitivity, evaluating the trade attributes is helpful.

A major trade is target information and features, and at what point in the engagement are they available. Generally, the seeker engagement space can be partitioned into three phases: acquisition, track, and endgame. During acquisition and track initiation, both coherent detection and Geiger mode systems provide advanced airborne remote instrumentation (AARI) target dynamics. The Geiger mode system cannot measure intensity directly, but can derive it by using a series of laser pulses. The coherent system can provide target dynamics with Doppler processing. This process can be enhanced by the addition of waveform modulation as is used in the Doppler radar community.

The Geiger mode system in this unresolved regime can make target velocity calculations based on the range measures at high pulse repetition rate (e.g., tens of kHz). As the target becomes resolved, the Geiger mode system can measure target dynamics when sufficient pixels are available.

As the engagement transitions to the endgame, accurate aimpoint selection and guidance (as opposed to discrimination), are the primary drivers. Here, both coherent detection and Geiger mode systems should be equal, but it may become necessary to have a hybrid system as shown in FIG. 4c, where the inner part 442 of the receiving laser detector array performs coherent detection, and the outer part 443 of the laser detector array performs linear mode direct detection. Such a hybrid laser detector configuration will reduce the area where coherence must be maintained. Other such hybrid schemes where portions of the detector array are capable of operating in a dedicated mode are possible.

Laser wavelength trade considerations include the conversion efficiency from input power to laser power, quantum efficiency of available detectors, required resolution for a given aperture size, target reflectivity and spectral separation from energetic clutter. Also, for photon detection, there are more photons per unit energy as the wavelength is increased.

Dual Mode Seeker

FIG. 1 is a model diagram illustrating a dual mode seeker configured in accordance with one embodiment of the present invention. The seeker includes an optical bench 105, a laser housing 115, a laser detector housing 120, an IR detector 125, and a dewar 130. This dual mode seeker system is adapted to provide a 3D image generated from a laser illuminated target.

The optical bench 105 further includes an IR exit port 105a, a laser exit port 105b, and a solar shield 105c. Internal to the optical bench 105, and not visible in FIG. 1, are a telescope, optical pathway and optical elements, a dichroic beam splitter, and a bandpass filter, which will be discussed in reference to FIGS. 2a, 2b, and 2c. As will be seen, the optical bench 105 has a folded optical path, thereby enabling compactness of the system. The optical pathway for the laser information is the same as that for the IR information. The dichroic beam splitter separates out the laser information from the broadband IR.

The laser housing 115 includes the laser and associated componentry, such as power circuitry, a beam splitter, an attenuator, and related electronics. The laser housing may further be configured with a steering mirror to adjust the pointing of the laser for boresighting to the ladar detector/receiver. Specific embodiments and functionality of the laser housing 115 contents will be discussed in reference to FIGS. 3a and 3b, as well as FIGS. 4a and 4b.

The laser detector housing 120 can be configured with a number of detector configurations. In one embodiment, the laser detector housing 120 includes a single photon detector, fiber coupling, X-Y table drive motors, and associated electronics. The motors can position the fiber precisely in steps to simulate a focal plane array avalanche photodiode detector (APD FPA). Alternatively, the laser detector in housing 120 is an actual APD FPA of a predefined dimension. The X-Y table motors are not necessary in such an embodiment. In either case, detector electronics enable range gating and fast recovery. Additional discussion on detector configurations is in reference to FIGS. 4a and 4b.

The IR detector 125 can be mounted on a dewar 130 or other cooling mechanism to ensure optimal performance. Generally, the IR detector 125 is an FPA having a size that provides the desired resolution. In one embodiment, the FOV of the laser detector substantially matches the FOV of the IR detector 125, but at a higher resolution (e.g., 2× greater or more). For example, the IR detector 125 can be a 256 by 256 InSb FPA of 30 micrometer elements (e.g., extreme ultra-violet-imaging spectrometer—EIS), and the laser detector can be a 1024 by 1024 Si APD FPA having a 10 micrometer pitch and an instantaneous field of view (IFOV) of 40 microradians.

Optical Bench

Figure 2A:
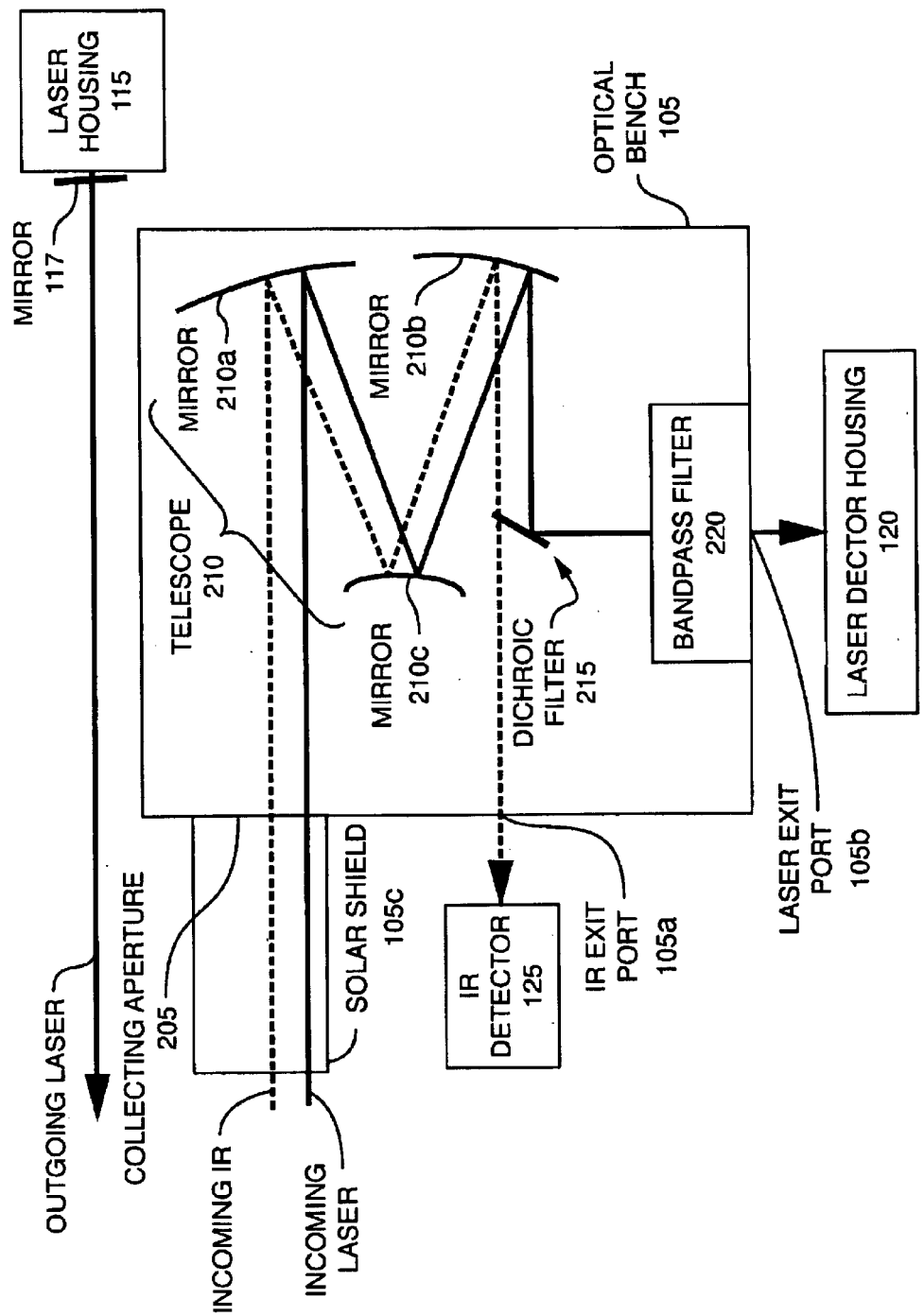
FIGS. 2a–c each illustrate a schematic diagram illustrating the optical bench configured in accordance with an embodiment of the present invention.
Figure 2B:
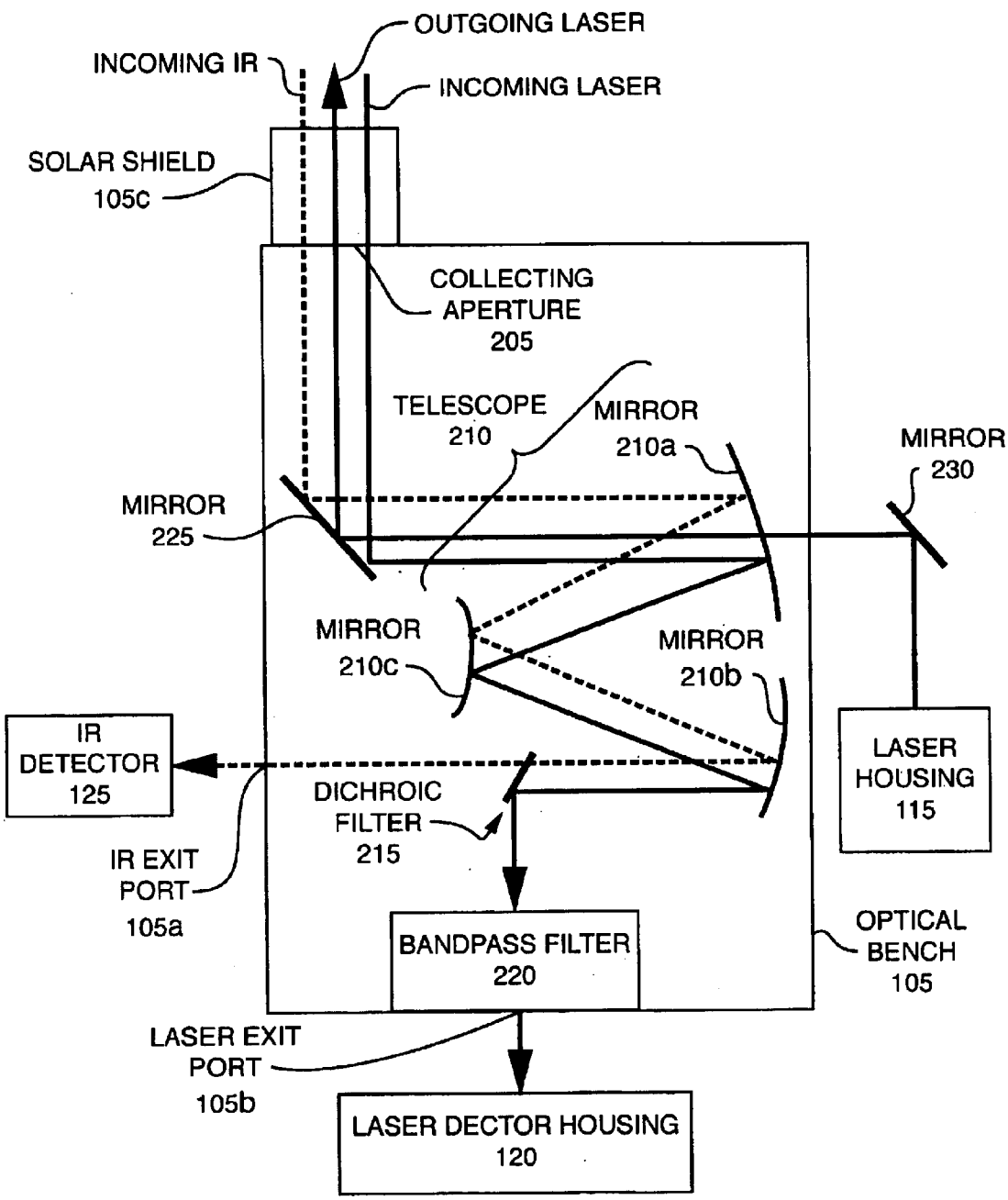
Figure 2C:
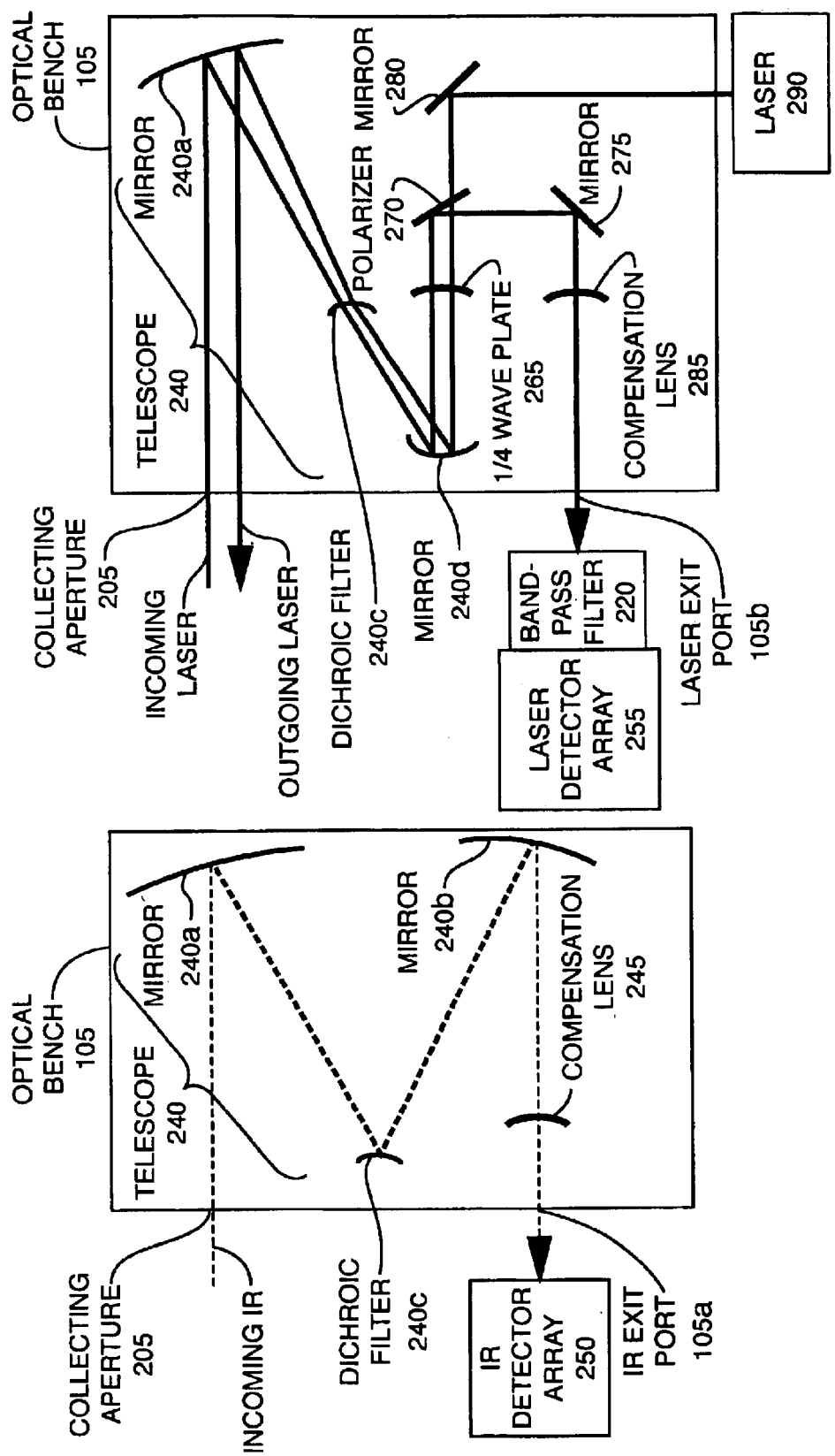

An objective system concept is described herein that addresses key system requirements, while maintaining cognizance of kill vehicle (KV) constraints. The trade of pointing and stabilization approaches drives the system design more than any other. FIGS. 2a, 2b, and 2c demonstrate example configurations.

FIG. 2a is a schematic diagram illustrating the optical bench 105 configured in accordance with one embodiment of the present invention. As can be seen, IR exit port 105a, laser exit port 105b, and the solar shield 105c of the optical bench 105 are shown, along with a collecting aperture 205, a folded optical pathway including telescope 210 with its mirrors 210a–c, a dichroic beam splitter 215, and a bandpass filter 220. Note that the optical pathway for laser information is the same as that for IR information, up to the dichroic element 215.

In this particular embodiment, the laser pulse from laser housing 115 is located so as to provide a line of sight above the bench 105. Mirror 117 can be used to steer the laser beam. The beam is aimed at targets that fall within the field of regard (FOR) of telescope 210. The laser pulse can be positioned over the entire IR detector FOV. Scan mirror 117 provides an efficient mechanism for overall packaging. Alternatively, counter rotating wedges could be used for laser positioning, but would add more volume to package. In a gimbaled approach, the laser could be on gimbal, or mirrors could be used to transport the laser beam to on gimbal optics.

The dichroic filter 215 (e.g., 532 nanometer) is placed in the folded optical path, and is used to separate the broadband IR and laser returns and direct them to the corresponding detector. More specifically, the received IR information is provided to the IR detector 125 via the IR exit port 105a, and the returned laser information is provided to the laser detector in housing 120 via the laser exit port 105b. In one embodiment, the laser detector is a silicon APD to which the received laser energy is reflected into by the dichroic element 215.

The bandpass filter 220, which is operatively coupled between the dichroic filter 215 and the laser detector, is generally narrow (e.g., 1 nanometer), and is used to reduce the background into the laser detector. In one embodiment, this bandpass filter 220 is placed as closely to the laser detector so as to inhibit background from encroaching after the bandpass filter 220.

FIG. 2b is a schematic diagram illustrating the optical bench configured in accordance with another embodiment or the present invention. This embodiment is similar to that illustrated in FIG. 2a, in that a small diameter off axis optical system used for collection of broadband IR and laser returns is shown. Dichroic filter 215 is used to separate the IR and laser returns and direct them to the corresponding detector and bandpass filter 220 is used to reduce the background into the ladar detector. The collecting aperture 205 feeds the optical pathway, which is folded for compactness, and is common to both received laser and IR information. However, the embodiment of FIG. 2b further includes stabilized mirror technology for both IR line of sight stabilization and pointing of the laser to objects represented by the IR pixels of interest.

In particular, the IR image is stabilized by the combination of a two-axis mirror 225 and electronic stabilization of the focal plane image. The large mirror 225 is used to position both the IR sensor and the ladar FPA over the large FOR of telescope 210, which is effectively selected by the ground-based radar. In one embodiment, mirror 225 is a 60×42 mm mirror, having +/−11.25 degrees of mechanical movement. Image stabilization can be achieved, for example, by a gimbaled telescope 210 or a strapped down IR detector 125 (e.g., FPA configured with electronic stabilization).

The laser of housing 115 is pointed to the object of interest, as cued from the IR system, by a high speed, two-axis mirror 230. In this sense, small mirror 230 is used to position the laser over the IR detector's 125 FOV. In one embodiment, mirror 230 is a 10×7 mm mirror, having +/−0.85 degrees of mechanical movement. Such a high performance mirror has the ability to point the laser to within 5 microradians in 1 millisecond. Both mirrors 230 and 225 have sufficient bandwidth (response time) to operate in typical kill vehicle environments. Alternatively, the laser can be pointed to the object of interest by a high speed MEMS device or gimbaled telescope.

Note that outgoing laser pulses from the laser of housing 115 travel a limited portion of the folded optical path. In this particular embodiment, the laser shares the mirror 225 and the common aperture 205 of the IR and ladar receivers, but does not share the remainder of the optics. This approach simplifies bore sighting the ladar with the IR, given fewer optical elements. The approach also facilitates minimum loss in either receive path, and greater isolation of the transmitted laser pulse to the laser receiver. Another benefit is the receive path optics do not have the burden of handling the high-energy laser pulse.

FIG. 2c is a schematic diagram illustrating the optical bench configured in accordance with another embodiment of the present invention. The optical train of this embodiment is somewhat more complex than those discussed in reference to FIGS. 2a and 2b, so the IR and ladar optical pathways are shown separately for purposes of clarity. Optical elements that are common to each pathway are designated with a similar reference number.

The optical bench 105 in this configuration includes telescope 240, compensation lens 245, ¼ wave plate 265, polarizer 270, fast scan mirrors 275 and 280, and compensation lens 285. The telescope 240 has a number of optical elements, including mirrors 240a, 240b, and 240d, as well as a dichroic filter 240c. Incoming IR received from the target area is received at the collecting aperture 205 and provided to an IR detector array 250 via the telescope 240 and the compensation lens 245. The dichroic filter 240c separates out the IR information from the laser information as previously discussed. Incoming laser returned from the target area is received at the collecting aperture 205 and provided to a laser detector array 255 via the telescope 240, ¼ wave plate 265, polarizer 270, compensation lens 285, and the bandpass filter 220. The bandpass filter 220 is generally narrow (e.g., 1 nanometer), and is used to reduce the background into the laser detector as previously discussed. Laser 290 illuminates the selected target space, the beam being steered into the telescope by fast scan mirror 280 for transmission out the collecting aperture 205.

This configuration employs a polarization coupled ladar (by virtue of ¼ wave plate 265 and polarizer 270), where the laser transmits circularly polarized (e.g., RH), and the returned laser is oppositely circularly poloarized (e.g., LH). Thus, the transmitted laser cannot leak directly into the detector 255. The compensation lens 245 improves image quality in the IR path, while lens 285 improves image quality in the ladar path. Other compensation schemes and configurations will be apparent in light of this disclosure, and the optical train may include more or less elements as dictated by desired results and conventional optical processing techniques. In addition, some optical elements may be integrated with other optical elements. For example, the ¼ wave plate 265 and polarizer 270 may be integrated into the telescope 240.

One embodiment of the configuration illustrated has the following specifications. The collecting aperture 205 is 20 centimeters, and the laser 290 is a 1.06 micron laser having a 1 nanosecond pulse width at 55 millijoules. The fast scan mirror 275 is 33 by 55 millimeters with +/−11.25 degrees of mechanical movement, and the fast scan mirror 280 is 20 by 32 millimeters, providing +/−0.85 degrees of mechanical movement. The dichroic filter 240c operates to separate the 1.06 laser energy, and the bandpass filter 220 operates at 1 nanometer. The IR detector array is a 1024 by 1024, two color, Si:BIB FPA. Such a silicon blocked impurity band detector provides long range detection, and has wide spectral bandwidth. The laser detector array 255 is a 12 by 12 Si APD FPA having a 10 micrometer pitch and an IFOV of 40 microradians.

Note that the laser power, mirror sizes, and common IR/ladar collecting aperture can be scaled to meet range detection requirements within the physical constraints of the seeker. Numerous alternative optical bench configurations will be apparent in light of this disclosure. For instance, the embodiments illustrated herein are off-axis designs having a folded optical path. Alternative configurations could include other off-axis designs (e.g., Korsch configuration), or on-axis designs may be employed as well (e.g., Cassegrain configuration). In addition, the aperture size of the illustrated embodiments is about 5.0 centimeters, but can vary, for example, from 1 to 50 centimeters. The telescope and optical elements can be selected based on the application, given performance criteria such as desired operating range, operating wavelength for respective IR and ladar systems, and processing speeds.

Laser Housing

Figure 3A:
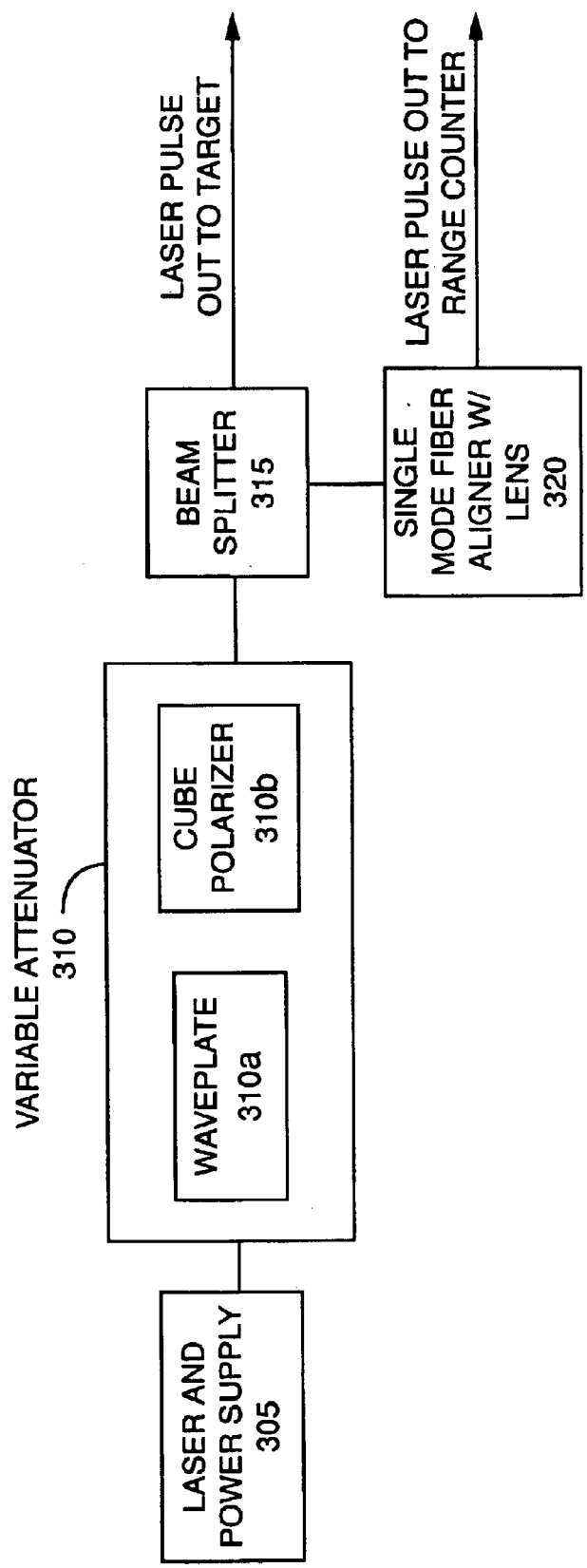
FIG. 3a illustrates a block diagram of a laser housing configured in accordance with an embodiment of the present invention.
Figure 3B:
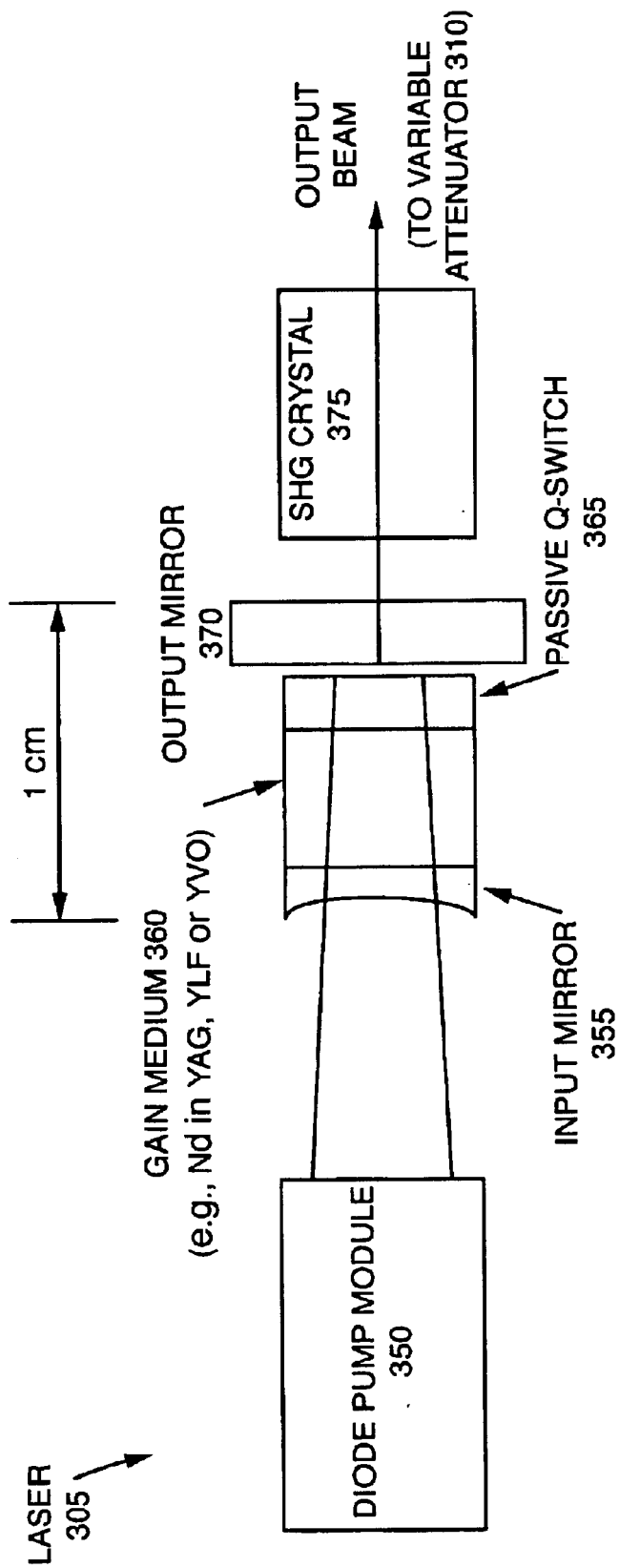
FIG. 3b illustrates a block diagram of a laser shown in FIG. 3a configured in accordance with an embodiment of the present invention.

FIGS. 3a and 3b illustrate a laser configuration in accordance with one embodiment of the present invention. This particular embodiment, which could be included in housing 115 of FIGS. 1, 2a, and 2b, includes a laser and power supply 305, a variable attenuator 310, a beam splitter 315, and a single mode fiber aligner with lens 320. This particular laser configuration can be used, for example, in conjunction with the laser detector illustrated in FIG. 4a. Note that the beam splitting is performed within the laser housing 115. In alternative embodiments, such splitting may be performed externally. In any case, each laser pulse pathway is associated with latency, which should be accounted for in analysis.

The laser and power supply 305 can be, for example, a diode-pumped solid-state green laser operating at 532 nanometer to provide high resolution. The variable attenuator 310 includes a wave plate 310a in rotary stage, and a cube polarizer 310b. The beam splitter 315 is, for example, a 4-96 splitter at 532 nanometer. The single mode fiber aligner with lens 320 allows a single mode of the laser pulse to be provided to supporting circuitry, such as the trigger input of a range counter. The output of the aligner 320 is coupled to a single mode fiber.

For Geiger mode operation, a narrow (e.g., <1 ns) laser pulse is required to provide sufficient range resolution and accuracy. This pulse width can be achieved by using a short cavity passive Q-switched laser as shown in FIG. 3b. This particular configuration of laser 305 includes a diode pump module 350, an input mirror 355, a gain medium 360, a passive Q-switch 365, an output mirror 370, and a second harmonic generation (SHG) crystal 375.

Generally, the laser cavity is short (e.g., 1 cm or less), because the pulse width increases linearly with the cavity length. In addition, a short absorption length provides efficient lasing with a short cavity length. The lasing threshold is a function of the cross section of the gain medium 360, which can be implemented with Nd: YAG, YLF, or YVO, for example.

Laser Detector Configuration—Single Detector Mode

Figure 4A:
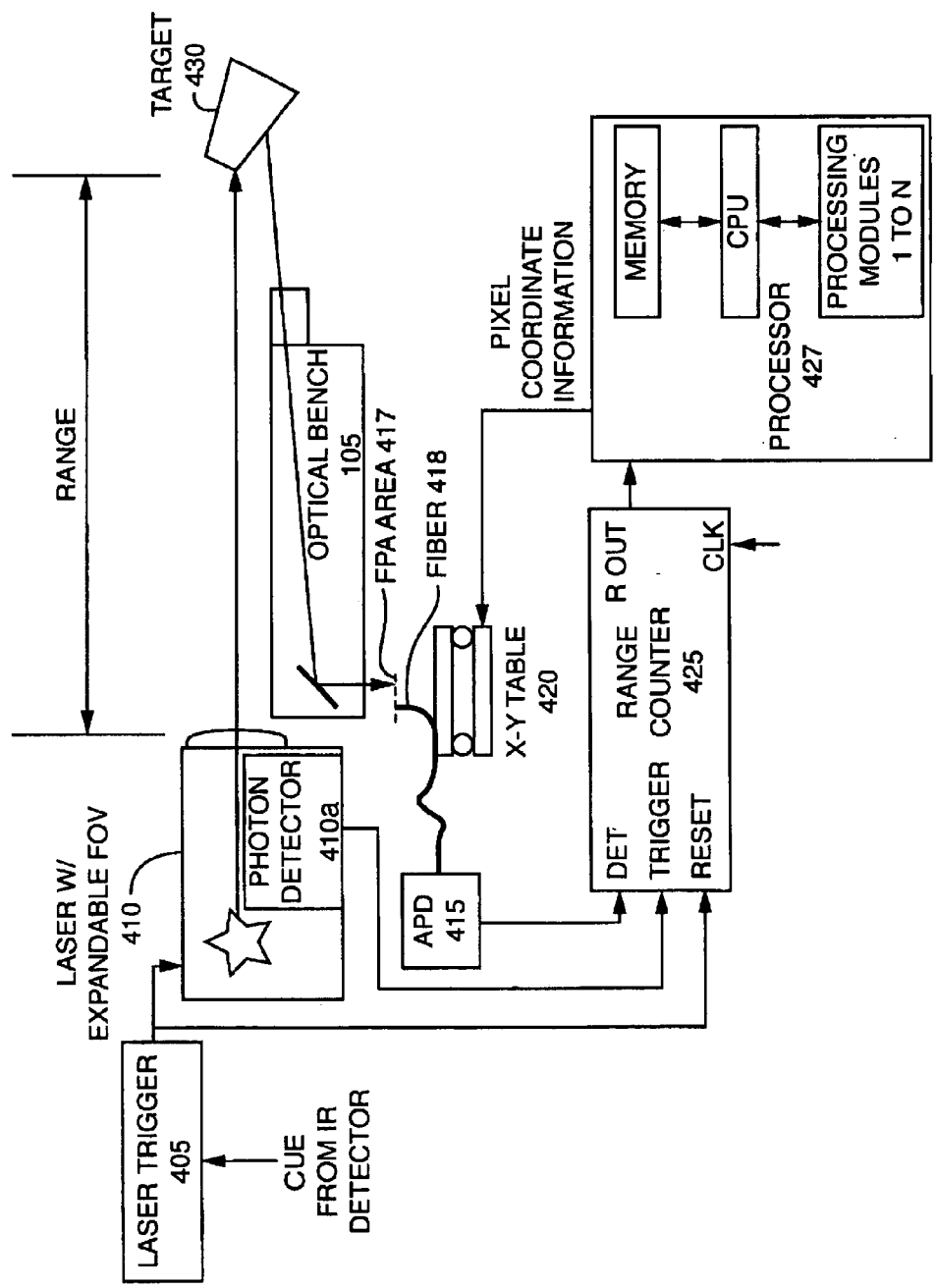
FIGS. 4a and 4b each illustrate a block diagram of laser transmit and receive sections of a dual mode seeker configured in accordance with an embodiment of the present invention.

FIG. 4a is a block diagram illustrating laser transmit and receive sections of a dual mode seeker configured in accordance with one embodiment of the present invention. In particular, a single fiber detector configuration is shown, including a laser trigger 405, a laser 410, an APD 415 optically coupled with a fiber 418, an array area 417, X-Y table motors 420, a range counter 425, and a processor 427. Laser pulses are reflected from target 430, and returned to the receiver via the optical bench 105. As previously discussed, a dichroic element and bandpass filter can be used to facilitate this return, as well as a common collecting aperture and folded optical pathway.

The laser receiver operates in a photon counting mode, where a single detected photon determines the range to the target 430 in each pixel location of array area 417, which is formed by moving fiber 418 to corresponding pixel coordinates. Thus, a virtual APD FPA is formed. Such a virtual array configuration may be desired for providing a specific sized detector array that is not readily available. When the target is resolved, this information is used to generate a 3D image of the target 430. At long range or in situations with high foreground clutter, or other situations where the number of photons returned are low, typically less than a single photon, a number of high frame rate images are used to build up a complete image.

Note that laser trigger 405 and laser 410 may be included, for example, in the laser housing 115 shown in FIG. 1. Similarly, the APD 415, array area 417, fiber 418, X-Y table motors 420, and range counter 425 may be included in the laser detector housing 120 shown in FIG. 1. Laser housing 120 can be interchangeable for different laser detector configurations.

The laser 410 includes a photon detector 410a, which detects when the laser 410 is activated. This enables a timing measurement from the generation of the outgoing laser pulse to the first returned photon. In one embodiment, the laser 410 is a 532 nanometer laser that provides high resolution, and the photon detector 410a triggers the range counter 425 to start counting so that the distance to the target 430 can be determined. The clock input (Clk) of the range counter 425 provides a known time reference used in calculating ranges. The range between the laser 410 and the object 430 may vary significantly, ranging from, for example, 10 meters to 500 kilometers.

In one embodiment of the single fiber detector configuration, fiber 418 is a single 50 micron fiber detector that is positioned in a 5 mm×5 mm FPA area 417, thereby simulating an APD FPA by using the X and Y table motors 420. For instance, the motors can position the fiber 418 precisely in 50 micron steps to simulate a 100×100 APD FPA. Thus, a laser pulse will be transmitted for each virtual pixel location of the virtual array formed by moving the fiber 418. Once the return pulse registers on a virtual pixel location (or a timeout occurs) as sensed by APD 415, X and Y table motors 420 move the fiber 418 to the next virtual pixel location, and the laser pulse is transmitted again. The process can be repeated for each pixel location.

A pixel timing circuit that measures the time from the generation of the outgoing laser pulse to the first returned photon is employed by the laser detector. In the embodiment shown, range counter 425 is used for this purpose. A silicon (e.g., CMOS) process (e.g., executing on a dedicated range counting processor or processor 427) can be employed to implement the range counter 425, to provide a timing resolution of 0.5 ns (3-inch range resolution).

In this single photon counting configuration, the range counter is adapted to receive data from the APD 415 for each virtual pixel location, thereby enabling a range calculation with each pulse of laser return information on a pixel by pixel basis. In particular, a range count (R out) is generated by the range counter 425 for each virtual pixel location and provided to processor 427, which is programmed to receive and analyze the data.

The raw data can be stored, for example, in a spreadsheet where each cell represents the range to the target 430 for a particular X-Y table 420 position (or virtual pixel location). The data is then range gated to the target distance. The remaining points (i.e., the points that were not eliminated by range gating) are plotted and an image is formed.

Processor 427 may be implemented, for example, with a microcontroller unit configured with supporting functionality such as one or more CPUs, volatile and non-volatile memory (e.g., for processing work space and storing application specific processes 1-N), and I/O ports. Various processing schemes will be apparent in light of this disclsoure, and the present invention is not intended to be limited to any one such scheme. For example, the functionality of range counter 425 may be integrated into the processor 427.

Numerous routines or processes can be executing on processor 427 at one time, with each process associated with I/O ports. For instance, one process can carry out 3D to 3D correlation between the 3D ladar images and the TOM generated by the surface based radar. Another process can carry out range calculations based on data received from the range counter 425. Another process can carry out image generation based on range data. Another process can carry-out laser parameter adjustments based on calculated range data. Another process can carryout data fusion between, for example, the TOM and IR data, IR and ladar data, TOM and ladar data, and IR/TOM data with ladar data. Conventional data fusion techniques can be used here. Another process can correlate uploaded radar tracks with the corresponding IR tracks that are sensed.

Input ports can be used to provide stimulus and other information required by a respective process. For example, range information can be received from the range counter 425, and TOM can be received from the ground based radar or supporting assets (e.g., satellite). Output ports can be used to provide information from one process to another, or to other componentry included in the system. For example, pixel coordinate information can be provided to the X-Y table motors 420, or laser control information (e.g., power, pulse width, and frequency) can be provided to the laser 410, or control information (e.g., x-y mirror or gimbal coordinates) can be provided to the optical bench 105.

Thus, the processor 427 may be part of an overall dual mode seeker processor scheme that supports various seeker funtionality, such as laser pulsing, scan mirror control, laser and IR detector functionality, image formation, track processing, and other algorithmic based processing or analysis. In an alternative embodiment, a number of dedicated processors (e.g., microprocessors) may be programmed or otherwise configured to carry out such specific tasks and functions.

Laser Detector Configuration—Detector Array Mode

Figure 4B:
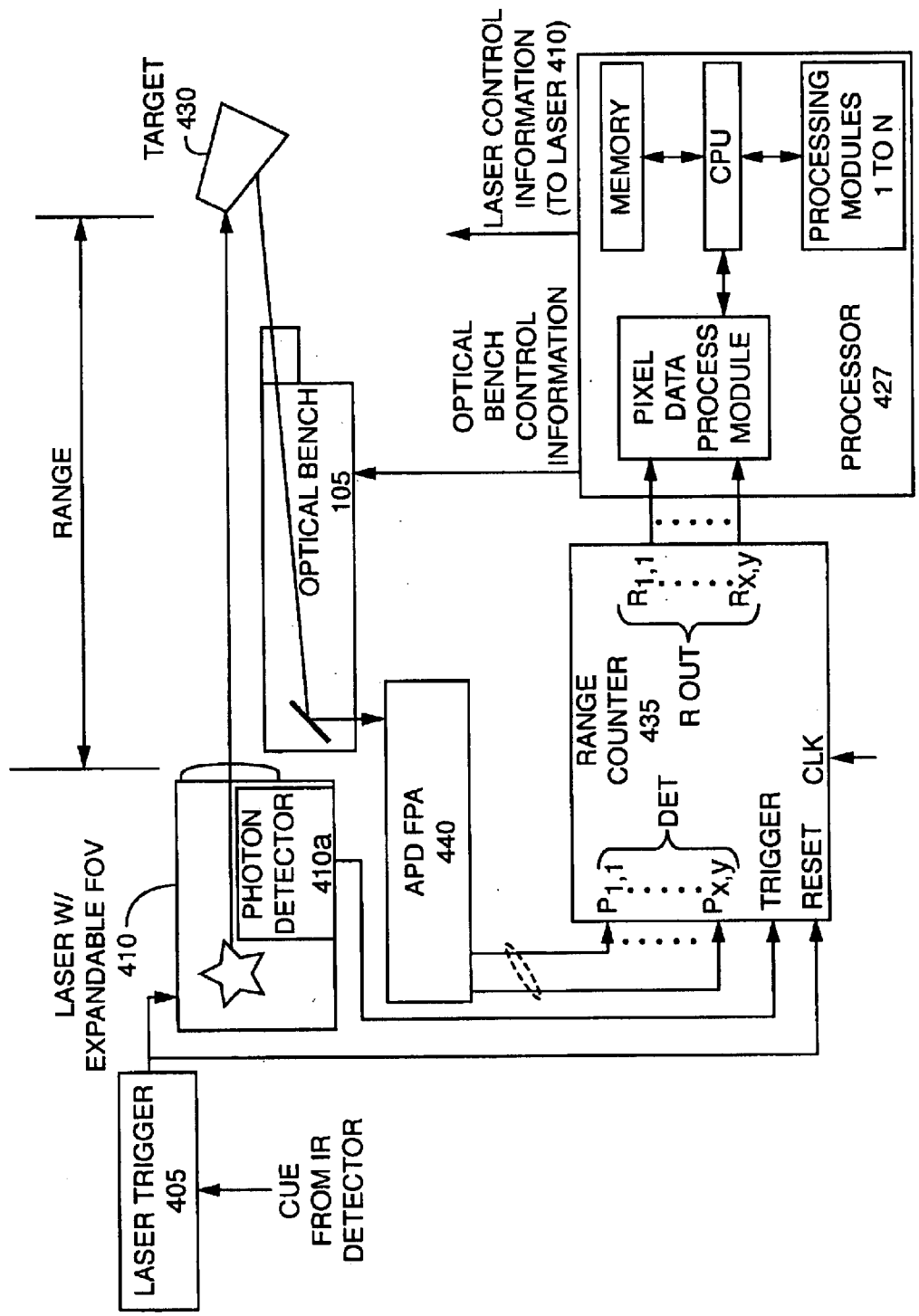
Figure 4C:
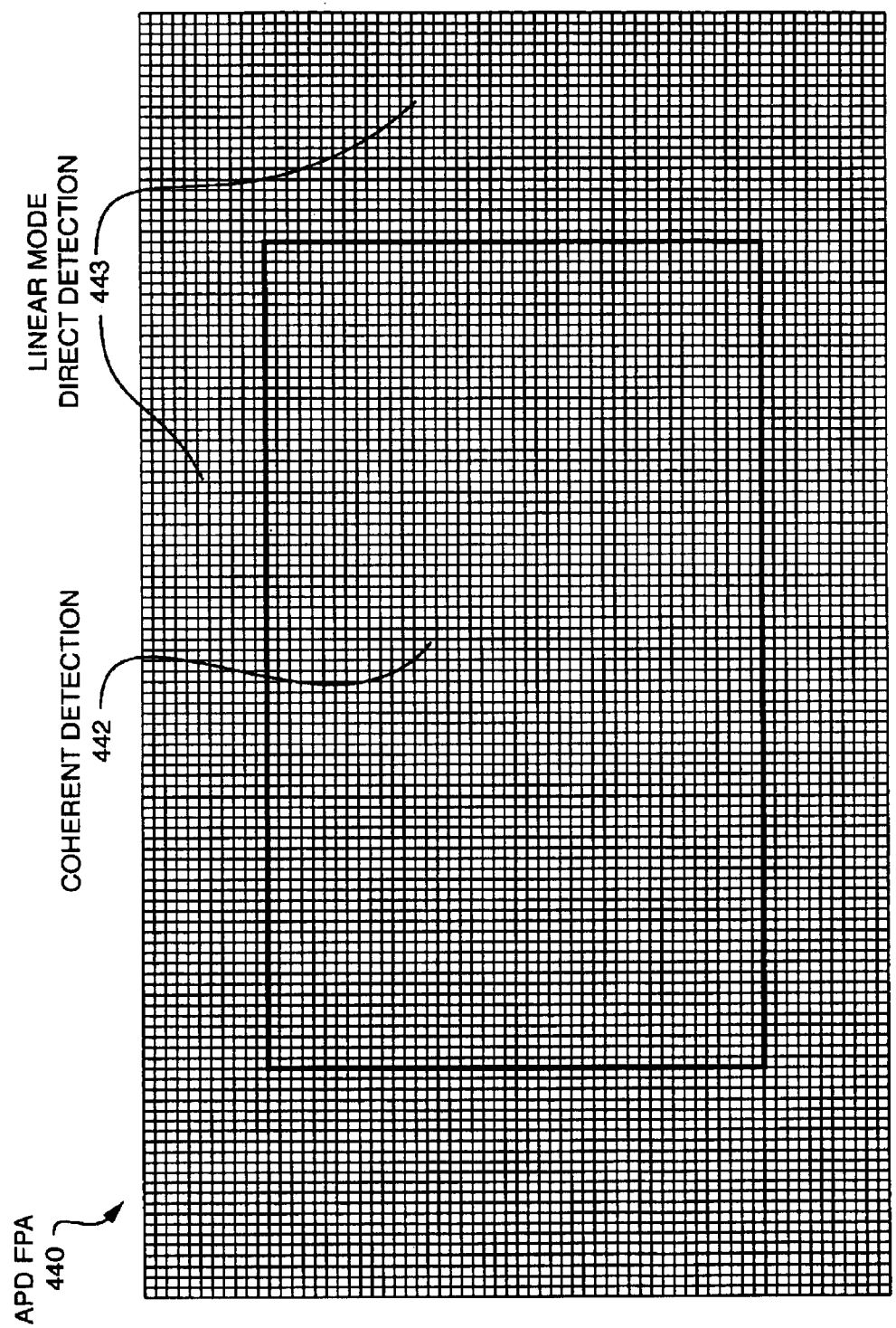
FIG. 4c illustrates a hybrid laser detector configuration in accordance with an embodiment of the present invention.

In an alternative embodiment, the laser detector in housing 120 includes an actual APD FPA of a predefined dimension (e.g., x-pixels by y-pixels), as opposed to a simulated APD FPA using a moveable APD. One such configuration is illustrated in FIG. 4b. Note that the array area 417, fiber 418, and X-Y table motors 420 are not necessary in such an embodiment. Rather, a full APD FPA array 440 is provided, which may be configured with a number of pixels (e.g., 1024 by 1024). Such a configuration allows for parallel reception of 3D images, as opposed to the serial type, single detector configuration of FIG. 4a.

A range counter 435 is adapted to receive the pixel data ($P_{1,1}$ to $P_{x,y}$) in parallel from the APD FPA 440 for each transmitted laser pulse. Thus, a full complement of data for range calculations and image processing can be detected with each pulse of laser return information. Corresponding count/range data ($R_{1,1}$ to $R_{x,y}$) associated with each pixel is provided in parallel by the range counter 435 to the processor 427, for each returned laser pulse. Pixel data processing can then be performed, such as angle, angle, range calculations, 3D imaging, and data fusion.

The raw data $R_{1,1}$ to $R_{x,y}$ generated by the range counter 435 can be stored, for example, in a spreadsheet or lookup table, where each cell or entry represents the range to the target 430 for a corresponding pixel location. The data is then range gated to the target distance to filter out irrelevant foreground data. The remaining relevant points can then be plotted for image formation and analysis.

In one such embodiment, the APD FPA 440 is a large ladar FPA having a FOV that matches the IR FOV, but at higher resolution. For example, if the IR detector array is 256×256, then at four times the resolution the ladar FPA would be a silicon 1024×1024 array. Low bias voltage silicon APD devices for operation in the Geiger mode can be employed here. An alternative laser detector array is 32×32, and designed to operate at 532 nanometer, having 11 micron diameter APD devices on 100 micron pixel pitch. A micro lens can be coupled with each pixel to improve the fill factor associated with the array.

In one embodiment, the APD FPA 440 is a silicon APD array operating in the Geiger mode (single photon counting mode). This mode requires biasing the APD FPA 440 above its breakdown voltage, which typically provides gains of $10^6$. An APD is a current limited device so that current will stop flowing after each avalanche event. These events can be triggered by the conversion of a photon to an electron or by a thermal generated electron in the bulk silicon which is characterized by the dark current. The maximum allowable dark current increases as the range sample time (range gate) is decreased.

For missile defense applications, the initial range uncertainty is typically tens of meters to about 100 meters. This means that the APD FPA 440 can operate with relatively high dark count rates (e.g., up to the low kHz). If it ever becomes necessary to operate with long range gates, then the silicon can be modestly cooled, for example, using a thermal electric cooler. Note that alternative APD devices are also available using HgCdTe and InGaAs technologies for operation with near IR laser sources. Noise and cooling requirement trades relative to silicon, as well as other wavelength trades will determine the selection.

Note that the previous discussion in reference to processor 427 equally applies here, and that numerous processing schemes are possible in light of this disclosure. A pixel data processing module may further be included, which is programmed to receive and process pixel data in parallel so that range gating and imaging can be rapidly performed for each transmitted laser pulse.

Methodology

Figure 4D:
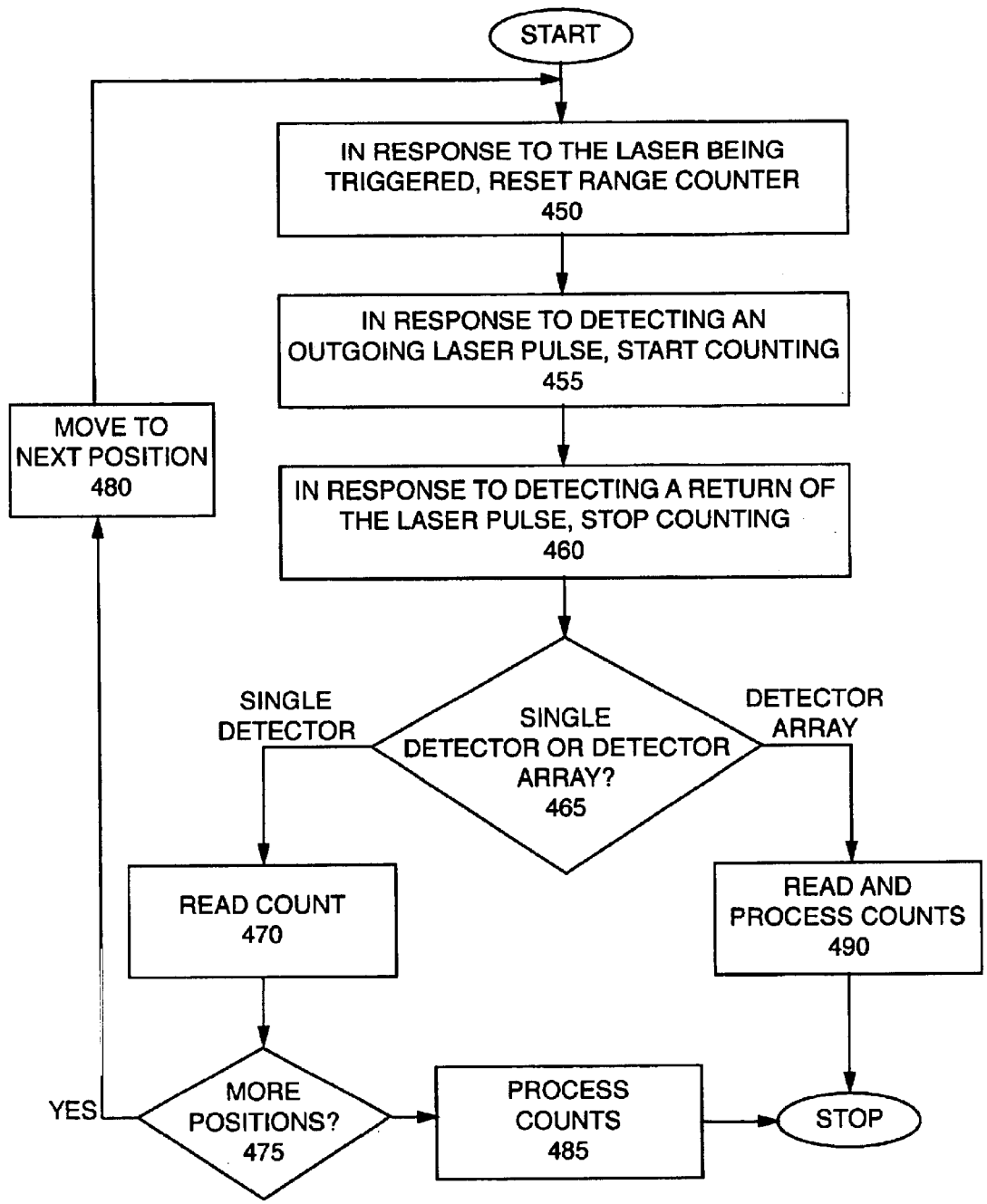
FIG. 4d illustrates a method for transmitting and receiving laser information using a dual mode seeker configured as shown in either FIG. 4a or FIG. 4b.

FIG. 4d illustrates a method for transmitting and receiving laser information using a dual mode seeker configured as shown in FIGS. 4a and 4b. The method may be carried out, for example, by processor 427 or other suitable processing environment for each transmitted laser pulse.

In response to the laser being triggered, the method begins with resetting 450 the range counter. In one embodiment, the laser is triggered by a laser trigger, which is cued by the IR detector. In response to detecting an outgoing laser pulse, the method continues by starting 455 a count. A photon detector can be used to detect the outgoing laser pulse, and to trigger the counter.

In response to detecting a return of the laser pulse, the method further includes stopping 460 the count. If the laser detector is configured with optional operating modes, the method may further include determining 465 whether the detector is operating in a signal detector mode, or detector array mode.

If operating in single detector mode, the method proceeds with reading 470 the count. In one embodiment, the return laser pulse is provided to the APD 415 via the optical bench 105, and a fiber 418. The method proceeds with determining 475 whether there are more pixel positions. If so, coordinate information associated with the next pixel position is provided to the X-Y motors 420, and the method proceeds with moving 480 the fiber to the next pixel position. This process can be repeated until all pixel positions are interrogated.

Once virtual pixel interrogation is complete (no more positions), then the method may further include processing 485 the counts associated with the virtual pixels. For example, a full 3D image can be formed. If there are no more pixel positions or processing is complete, the method concludes.

If operating with an array of detectors, the method may proceed with reading and processing 490 the counts (e.g., 3D image formation).

Thus, one embodiment of a dual mode seeker described herein may include the following features:

A laser transmitter and receiver integrated with an IR optical system. The optical pathway for the laser is the same as the IR system pathway. A dichroic filter at 532 nanometer separates out the laser line for the broadband IR.

A detector housing that is interchangeable for different detector configurations, including both a single fiber detector and an APD FPA. Either type of detector configuration may operate in at least one of Geiger detection mode, linear detection mode, coherent detection mode, or a hybrid detection mode.

A laser housing having a steering mirror to adjust the pointing of the laser for boresighting to the receiver.

An optical bench having a telescope which meets sensitivity requirements, and a folded optical path, enabling compactness of the system.

The system as a whole will provide a 3D image generated from the laser illuminated target.

Implementation Details

It is assumed that at long detection ranges, the complete threat cloud is within the FOV of the IR seeker. This would require the IR seeker to have a FOV of about 3 degrees to view a 5 km cloud at 100 km. The fusion of radar and IR depictions can be used to reduce the number of unknown objects (or clusters) within the primary FOV to less than 100 potential targets. A scan mirror is used to point the laser at each of these unknown objects, as cued by the IR system. A 10 kHz ladar pulse repetition frequency, for example, would allow four milliseconds for mirror slew and settle time and 60 laser pulses on each target.

Figure 9:
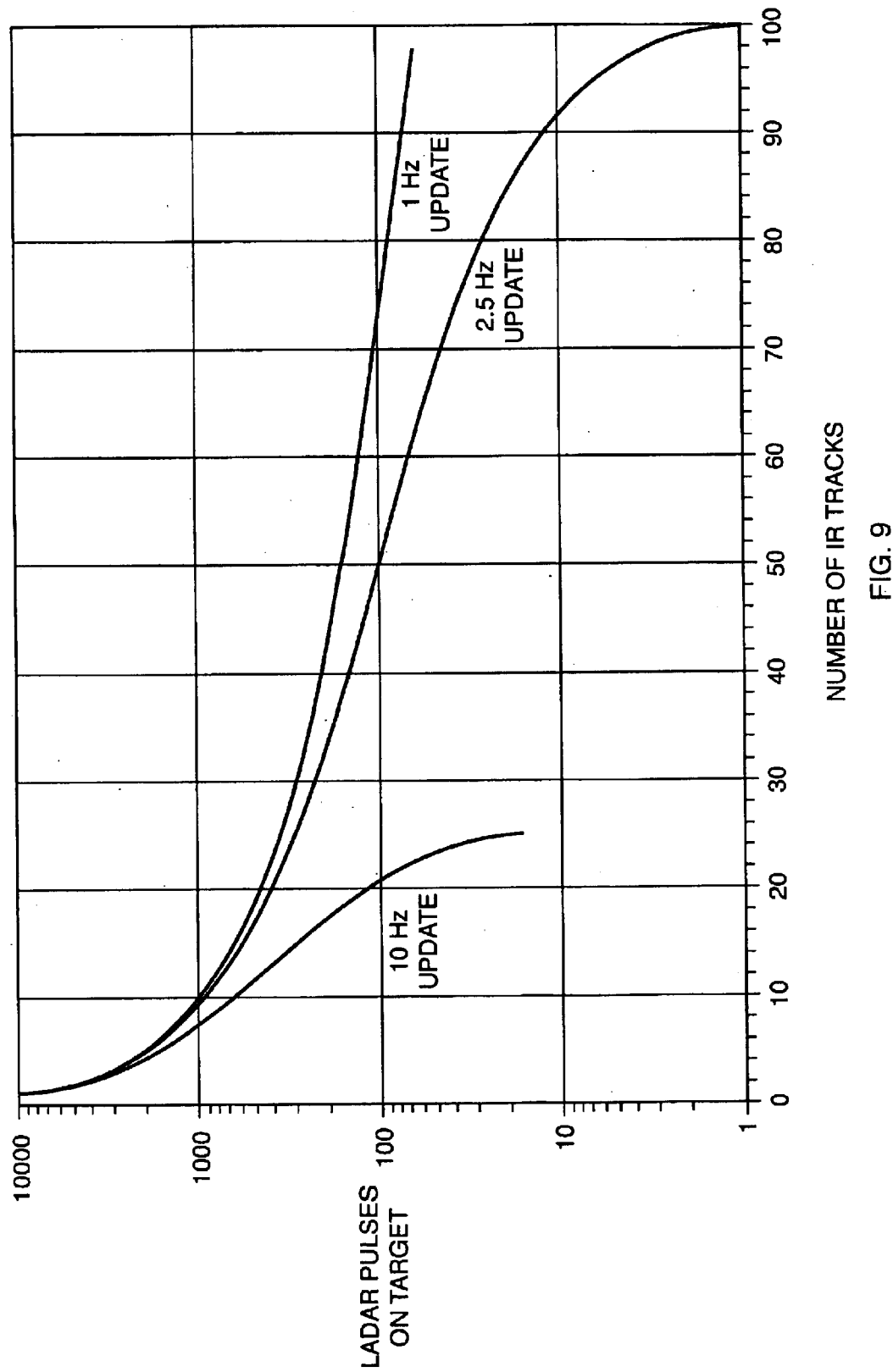
FIG. 9 illustrates track update rates for a ladar of a dual mode seeker configured in accordance with an embodiment of the present invention.

The ladar system may initiate more than one track for each IR track, since it provides line of sight range information and has higher angular resolution than an IR seeker. In one embodiment, a 1 Hz update rate is provided for 100 IR tracks. If more than 100 IR tracks are present, then a fused IR-radar data prioritization scheme carried out by a ladar system processor (e.g., processor 427) can be used to select the 100 tracks with the highest probability to be the threat. For engagements with fewer IR tracks, the update rate can be increased as shown in FIG. 9. The allocation of ladar pulses is controlled by a track processor or processing function (e.g., running on processor 427) to best match the resource to the discrimination problem.

The ladar range resolution accuracy is about 6 cm or better. Thus, the measurement of one-meter range separation is not difficult for the special case when the decoys and RV are measured in the same laser pulse. The problem is more difficult when the objects are spaced by more than the laser beam width (e.g., 25 to 150 microradians). In this case, the measurements are made at different times since the beam must be repositioned on each object. The accuracy of the measurement is driven by how well the change in host vehicle position is known.

A flash ladar with a photon counting receiver array as described herein may be preferable given the small size of the current seekers and the desire to have lighter and more maneuverable host or kill vehicles for terminal phase systems. For interceptors with larger kill vehicles, however, other types of ladar such as range resolved Doppler may be preferable.

Selection of the 532 nanometer wavelength for one embodiment was made to maximize the resolution for available aperture. Other wavelengths will be apparent in light of this disclosure, and the present invention is not intended to be limited to any one wavelength or range of wavelengths. For instance, if a compromise can be made on resolution, or a large aperture is available, a wavelength of 1064 nanometer will improve system performance by 2× for a photon counting system. This assumes that the dark count for a device optimized for 1064 nanometer is not increased. This occurs because the improved laser conversion efficiency is offset by the APD quantum efficiency decrease, but there are twice as many photons generated per joule of laser energy.

Also for seekers that operate in the upper atmosphere, transmission and solar background favor operation at 1064 nanometer rather than 532 nanometer. The optical system, including the window through which the system "sees" the theater, would be easier to design and at a lower cost, as well as easier to fabricate since this operating wavelength is closer to the IR band on the seeker.

The laser shares the aperture of the IR and ladar receiver but does not share the remainder of the optics. This approach simplifies bore sighting the ladar with the IR with the minimum number of optical elements, minimum loss in either receive path and greater isolation of the transmitted laser pulse to the laser receiver. An additional significant benefit to this approach is the receive path optics do not have the burden of handling the high-energy laser pulse.

As will be understood in light of this disclosure, the ladar system may be an angle, angle, range/direct detection type system, or a pulsed Doppler/coherent detection type system, or a variation of these or such other systems as may evolve, having equal or greater capabilities.

Recall that the ladar receiver FOV is matched to the IR sensor FOV (also referred to as the system FOV), which is typically in the order of a few degrees. However, the ladar transmitter (e.g., laser 305) FOV is variable, being set initially in the order of hundreds of microradians, and capable of being be traversed quickly within the system FOV for pin pointing potential targets within the system FOV. Thus, early stage discrimination processing is enabled. Based on closing velocity and measurement of the angular size of the target (e.g., when the target width is getting bigger than the laser transmitter FOV), the ladar transmitter FOV is expanded, as by a continuous zoom or discrete step algorithm, to finally match that of the IR FOV.

Figure 10:
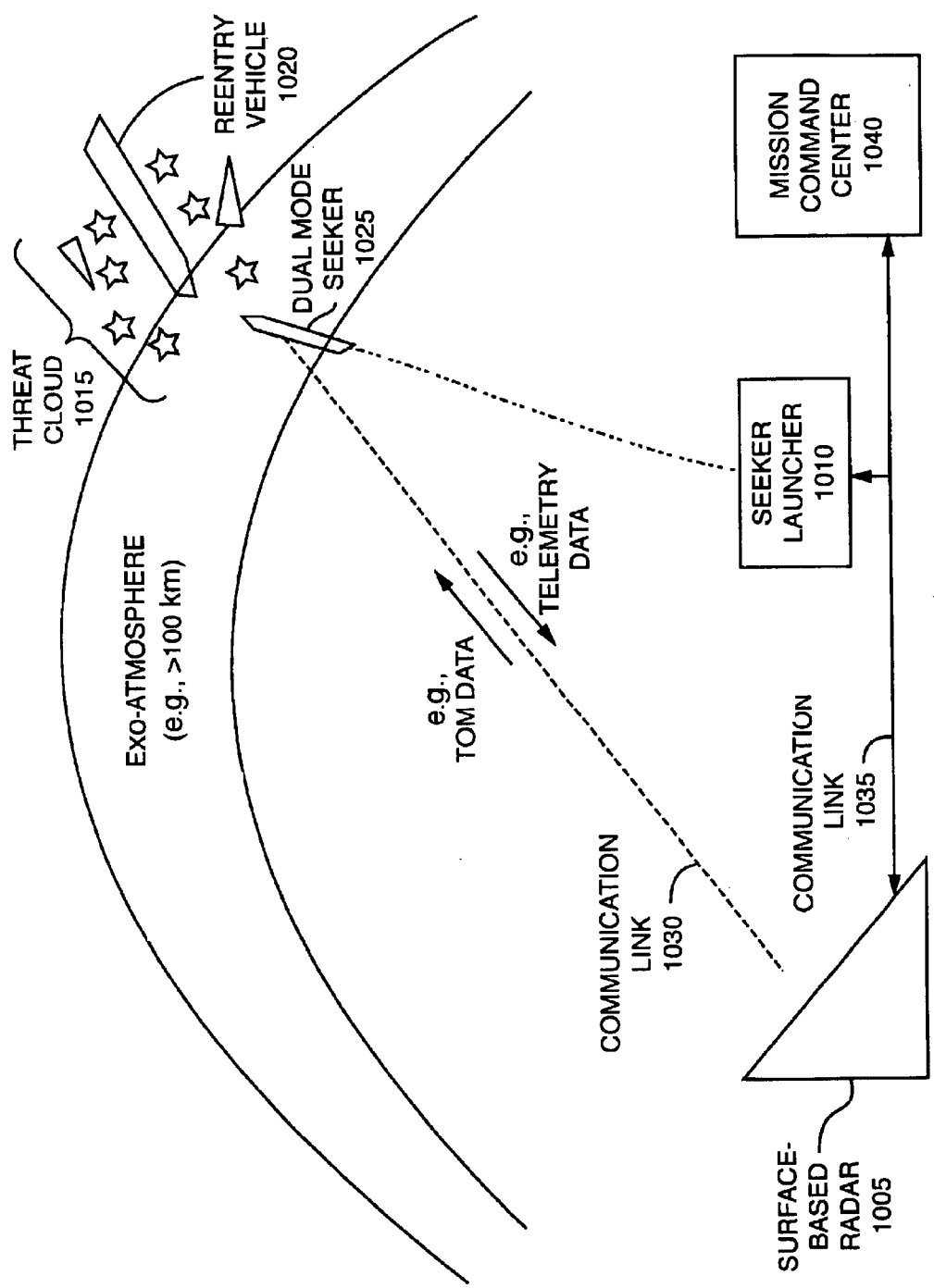
FIG. 10 illustrates a high level block diagram of a hit-to-kill missile defense system having a dual mode seeker configured in accordance with an embodiment of the present invention.

FIG. 10 illustrates a high level block diagram of a hit-to-kill missile defense system, and is provided to give context for one particular application of a dual mode seeker configured in accordance with an embodiment of the present invention. The system includes a surface-based radar 1005, a seeker launcher 1010, a mission command center 1040, and a dual mode seeker 1025 having both IR and ladar detection capability as discussed herein.

As can be seen, a threat cloud 1015 including reentry vehicle 1020 is approaching a defended target, but still traveling in the exo-atmosphere. The dual mode seeker 1025 has been launched in response to a command from mission control 1040. During the mid-course phase, the surface-based radar 1005 locks onto the elements in the threat cloud 1015, and provides preliminary targeting information to the dual mode seeker 1025 via communications link 1035.

As the dual mode seeker 1025 approaches the threat cloud 1015, information such as TOM data is uploaded from the surface-based radar 1005 to the seeker 1025 by wireless communications link 1030. The seeker 1025 can then correlate its 3D laser images with the onboard TOM and IR data to reliably discriminate the threat cloud 1015, and kill the reentry vehicle in the exo-atmosphere. The seeker 1025 may transmit telemetry data via the communications link 1030 to the surface-based radar 1005 so that seeker performance can be monitored and analyzed.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A dual mode seeker tot intercepting a reentry vehicle included in a threat cloud, and configured with an onboard ladar system coordinated with an onboard IR system, the seeker comprising:
    a telescope having two or more mirrors forming a folded optical path that is adapted to receive IR information and laser return information collected at a common aperture;
    a dichroic filter placed in the folded optical path, and adapted for separating the IR information from the laser return information;
    an IR detector adapted to detect the IR information separated by the dichroic filter, wherein the IR information is received from a field of view associated with the IR system;
    a laser detector adapted to detect the laser return information separated by the dichroic filter, the laser return information relevant to one or more objects included in the field of view;
    one or more processors configured to form three dimensional images of one or more objects included in the field of view based on the detected laser return information, thereby enabling dual mode discrimination of the threat cloud and reentry vehicle identification; and
    one or more processors configured to perform the dual mode discrimination based on the IR information and the three dimensional images.

2. The seeker of claim 1 wherein the dual mode discrimination is performed in exo-atmosphere.

3. The seeker of claim 1 wherein at least one of the one or more processors is configured to perform discrimination assessments based on discrimination parameters including at least one of relative velocity, track, and separation data.

4. The seeker of claim 1 wherein at least one of the one or more processors is configured to perform data fusion between at least two of target object map data, three dimensional laser image data, and two dimensional IR image data.

5. The seeker of claim 1 wherein at least one of the IR and ladar systems are adapted to cooperate with a ground based reentry vehicle detection/tracking system configured to define a primary target area coordinate.

6. The seeker of claim 1 wherein the ladar system is configured with a variable field of view that is expandable to substantially match the field of view associated with the IR system.

7. The seeker of claim 6 wherein the variable field of view associated with the ladar system is expandable toward the field of view associated with the IR system when at least one of closing velocity, track angle, or target size subtends the laser system's field of view.

8. The seeker of claim 6 wherein the variable field of view associated with the ladar system is initially smaller than the field of view associated with the IR system during engagement, and the ladar system is adapted to systematically interrogate the field of view associated with the IR system to discriminate objects located therein.

9. The seeker of claim 1 wherein the ladar system is configured to operate as at least one of an angle, angle, range direct detection type system, and a pulsed Doppler coherent detection type system.

10. The seeker of claim 1 wherein the laser detector includes an array and the ladar system is configured to operate as a hybrid detection system, where a first portion of the laser detector array performs coherent detection, and second portion of the laser detector array performs linear mode direct detection.

11. The seeker of claim 1 wherein the ladar system includes a laser and one or more steering mirrors for pointing the laser at objects in the held of view associated with the IR detector.

12. The seeker of claim 11 wherein outgoing laser pulses from the laser share the common aperture with the IR information and laser return information.

13. The seeker of claim 11 wherein outgoing laser pulses from the laser travel a limited portion of the folded optical path.

14. The seeker of claim 1 further including a bandpass filter operatively coupled between the laser detector and the dichroic filter, and adapted for reducing the background into the laser detector.

15. The seeker of claim 1 wherein the laser detector is configured with an avalanche photo diode optically coupled with a fiber, and X-Y table motors for moving the fiber to a number of positions, thereby forming a virtual detector array.

16. The seeker of claim 15 wherein the laser detector further includes a range counter that is adapted to receive data from the avalanche photo diode for each virtual pixel location, thereby enabling a range calculation with each pulse of laser return information on a pixel by pixel basis.

17. The seeker of claim 1 wherein the laser detector is configured with an avalanche photodiode detector focal plane array of a predefined dimension.

18. The seeker of claim 17 wherein the laser detector further includes a range counter that is adapted to receive pixel data in parallel from the avalanche photodiode detector focal plane array, thereby enabling a full complement of data for range calculations with each pulse of laser return information.

19. The seeker of claim 18 wherein for each pulse of laser return information, range data associated with pixels of the focal plane array avalanche photodiode detector is provided in parallel by the range counter to a processor, so that pixel data processing can be performed.

20. The seeker of claim 1 wherein each of the laser and IR detectors are associated with a resolution, and the resolution of the laser detector is at least two times higher than the resolution of the IR detector.

21. A dual mode seeker for intercepting a reentry vehicle included in a threat cloud, and configured with an onboard ladar system coordinated with an onboard IR system, the seeker comprising:
    a telescope having two or more mirrors forming a folded optical path that is adapted to receive IR information and laser return information collected at a common aperture;

a dichroic filter placed in the folded optical path, and adapted for separating the IR information from the laser return information;

a laser detector adapted to detect the laser return information separated by the dichroic filter, the laser return information relevant to one or more objects included in a field of view associated with the IR system;

a first processing module configured to form three dimensional images of one or more objects included in the field of view based on the detected laser return information, thereby enabling dual mode discrimination of the threat cloud and reentry vehicle identification; and a second processing module configured to perform the dual mode discrimination based on the IR information and the three dimensional images.

22. The seeker of claim 21 wherein the second processing module is configured to perform data fusion between at least two of target object map data, three dimensional laser image data, and two dimensional IR image data.

23. The seeker of claim 21 wherein the second processing module is configured to perform discrimination assessments based on discrimination parameters including at least one of relative velocity, track, and separation data.

24. The seeker of claim 21 wherein the laser detector is configured with an avalanche photodiode detector focal plane array of a predefined dimension.

25. The seeker of claim 24 wherein the laser detector further includes a range counter that is adapted to receive pixel data in parallel from the avalanche photodiode detector focal plane array, thereby enabling a full complement of data for range calculations with each pulse of laser return information.

26. The seeker of claim 24 wherein for each pulse of laser return information, range data associated with pixels of the focal plane array avalanche photodiode detector is provided in parallel by the range counter to a pixel data process module.

27. The seeker of claim 21 wherein the ladar system is configured with a variable field of view that is expandable to substantially match the field of view associated with the IR system.

28. The seeker of claim 27 wherein the variable field of view associated with the ladar system is expandable toward the field of view associated with the IR system when at least one of closing velocity, track angle, or target size subtends the laser system's field of view.

29. The seeker of claim 27 wherein the variable field of view associated with the ladar system is initially smaller than the field of view associated with the IR system during engagement, and the ladar system is adapted to systematically interrogate the field of view associated with the IR system to discriminate objects located therein.

30. A dual mode seeker for intercepting a reentry vehicle included in a threat cloud, and configured with an onboard ladar system coordinated with an onboard IR system, the seeker comprising:

a telescope having two or more mirrors forming a folded optical path that is adapted to receive IR information and laser return information collected at a common aperture;

a dichroic filter placed in the folded optical path, and adapted for separating the IR information from the laser return information;

a laser detector adapted to detect the laser return information separated by the dichroic filter, the laser return information relevant to one or more objects included in a field of view associated with the IR system, thereby enabling dual mode discrimination of the threat cloud and reentry vehicle identification; and one or more processors configured to perform the dual mode discrimination based on the IR information and the laser return information.

31. The seeker of claim 30 wherein the ladar system is configured with a variable field of view that is expandable to substantially match the field of view associated with the IR system.

32. The seeker of claim 31 wherein the variable field of view associated with the ladar system is expandable toward the field of view associated with the IR system when at least one of closing velocity, travel angle, or target size subtends the laser system's field of view.

33. The seeker of claim 31 wherein the variable field of view associated with the ladar system is initially smaller than the field of view associated with the IR system during engagement, and the ladar system is adapted to systematically interrogate the field of view associated with the IR system to discriminate objects located therein.

34. The seeker of claim 30 wherein the ladar system is configured to operate as at least one of an angle, angle, range direct detection type system, and a pulsed Doppler coherent detection type system.

35. The seeker of claim 30 wherein the laser detector includes an array and the ladar system is configured to operate as a hybrid detection system, where a first portion of the laser detector array performs coherent detection, and second portion of the laser detector array performs linear mode direct detection.

36. The seeker of claim 30 wherein outgoing laser pulses share the common aperture with the IR information and laser return information.

37. The seeker of claim 30 wherein outgoing laser pulses travel a limited portion of the folded optical path.

38. The seeker of claim 30 wherein the laser detector is configured with an avalanche photodiode detector focal plane array of a predefined dimension.

39. The seeker of claim 38 wherein the laser detector further includes a range counter that is adapted to receive pixel data in parallel from the avalanche photodiode detector focal plane array, thereby enabling a full complement of data for range calculations with each pulse of laser return information.

40. The seeker of claim 39 wherein for each pulse of laser return information, range data associated with pixels or the focal plane array avalanche photodiode detector is provided in parallel by the range counter to a processor, so that pixel data processing can be performed.

* * * * *

UNITED STATES PATENT AND TRADEMARK OFFICE
CERTIFICATE OF CORRECTION

PATENT NO. : 6,741,341 B2
DATED : May 25, 2004
INVENTOR(S) : Michael E. DeFlumere It is certified that error appears in the above-identified patent and that said Letters Patent is hereby corrected as shown below:

<u>Column 9,</u>
Line 4, delete "returned", insert -- received --.

<u>Column 17,</u>
Line 18, delete "tot", insert -- for --.

Signed and Sealed this

First Day of November, 2005

JON W. DUDAS
*Director of the United States Patent and Trademark Office*